US012570088B2

(12) United States Patent
Hirokawa et al.

(10) Patent No.: US 12,570,088 B2
(45) Date of Patent: Mar. 10, 2026

(54) PRINTING APPARATUS AND CONTROL METHOD

(71) Applicant: CANON KABUSHIKI KAISHA, Tokyo (JP)

(72) Inventors: Ryosuke Hirokawa, Kanagawa (JP); Takumi Otani, Kanagawa (JP); Yoshiaki Murayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 18/311,829

(22) Filed: May 3, 2023

(65) Prior Publication Data

US 2023/0382107 A1 Nov. 30, 2023

(30) Foreign Application Priority Data

May 31, 2022 (JP) ................................ 2022-088568

(51) Int. Cl.
*B41J 2/045* (2006.01)

(52) U.S. Cl.
CPC ....... *B41J 2/04573* (2013.01); *B41J 2/04586* (2013.01)

(58) Field of Classification Search
CPC ................ B41J 2/04573; B41J 2/04586; B41J 2002/16573; B41J 2/16517
See application file for complete search history.

(56) References Cited

U.S. PATENT DOCUMENTS

| | | | | |
|---|---|---|---|---|
| 6,382,764 | B1 * | 5/2002 | Shimoda | B41J 2/1652 347/19 |
| 6,557,969 | B1 * | 5/2003 | Murakami | B41J 2/16532 347/30 |
| 7,399,046 | B2 | 7/2008 | Teshigawara et al. | B41J 29/38 |
| 7,465,006 | B2 | 12/2008 | Edamura et al. | B41J 29/38 |
| 7,673,959 | B2 | 3/2010 | Maru et al. | B41J 29/393 |
| 8,317,290 | B2 | 11/2012 | Edamura et al. | B41J 29/393 |
| 8,851,618 | B2 | 10/2014 | Teshigawara et al. | B41J 29/393 |

FOREIGN PATENT DOCUMENTS

| | | |
|---|---|---|
| JP | H02-141249 | 5/1990 |

* cited by examiner

*Primary Examiner* — Thinh H Nguyen
(74) *Attorney, Agent, or Firm* — Venable LLP

(57) ABSTRACT

A printing apparatus including a printing unit to print an ink image on a print medium, a recovery unit executing a recovery operation for maintaining and recovering favorable ink ejection performance, an obtainment unit obtaining a dot count value, which is the number of times ink is ejected during printing, and a printing time period, which is a time period required for the printing, and a control unit controlling the recovery operation, based on a count value, which is an accumulated value of the dot count value, and a threshold value for determining whether to execute the recovery operation. When a dot count value per unit time based on the dot count value and the printing time period is equal to or less than a predetermined value, the control unit updates the count value to a value to which the dot count value is added, to control the recovery operation.

15 Claims, 15 Drawing Sheets

PRINTING APPARATUS AND CONTROL METHOD

BACKGROUND OF THE INVENTION

Cross-Reference to Priority Application

This application claims the benefit of Japanese Patent Application No. 2022-088568, filed May 31, 2022, which is hereby incorporated by reference herein in its entirety.

FIELD OF THE INVENTION

The present invention relates to a printing apparatus capable of ejecting ink by an inkjet system and a control method for controlling the printing apparatus.

DESCRIPTION OF THE RELATED ART

In an inkjet printing apparatus, for example, thermal energy is utilized to eject ink. In such an inkjet printing apparatus, depending on the operating environment, there is a case in which residual heat after ink ejection causes bubbles in the ink due to dissolved gas, and these bubbles accumulate in the ink inside the print head. For this reason, if the number of ink ejection times exceeds a certain number of times or more, ink ejection becomes unstable due to the accumulated bubbles, which may cause generation of an ejection failure in which ink is not properly ejected.

Japanese Patent Laid-Open No. H2-141249 discloses a technology in which the number of ink ejection times is measured, and, if the measured value exceeds a set value, a recovery operation, in which ink is forcibly suctioned from nozzles that eject ink by use of a suction pump for recovering and maintaining a favorable ink ejection performance from the nozzles, is executed.

However, as a result of studies, the inventors of the present application found that the generation of bubbles inside the print head depends not only on the number of ink ejection times, but also on the time period of ink ejection. That is, the inventors of the present application found that, even if the number of ink ejection times is the same, the longer the time period of ink ejection is, i.e., the longer the printing time period is, the more bubbles are generated inside the print head.

Therefore, with the technology disclosed in Japanese Patent Laid-Open No. H2-141249, in which execution of the recovery operation is controlled based only on the number of ink ejection times, there is a possibility of having a case in which ink ejection failures cannot be suppressed or a case in which the recovery operation is performed more than necessary and, thus, the ink consumption amount increases.

SUMMARY OF THE INVENTION

The present invention has been made in view of the above-described problems, so as to provide a technology capable of properly executing a recovery operation.

In a first aspect of the present invention, a printing apparatus includes a printing unit configured to print an image by ejecting ink to a print medium, a recovery unit configured to be capable of executing a recovery operation for maintaining and recovering a favorable ink ejection performance of the printing unit, an obtainment unit configured to obtain a dot count value, which is the number of times ink is ejected during printing performed by the printing unit, and a printing time period, which is a time period required for the printing, and a control unit configured to control the execution of the recovery operation, based on a count value, which is an accumulated value of the dot count value, and a threshold value for determining whether or not to execute the recovery operation to be performed by the recovery unit, wherein, in a case when a dot count value per unit time based on the dot count value and the printing time period is equal to or less than a predetermined value, the control unit updates the count value to a value to which the dot count value is added, in order to control the execution of the recovery operation based on the updated count value and the threshold value, and wherein, in a case when the dot count value per unit time is greater than the predetermined value, the control unit controls the execution of the recovery operation based on the count value and the threshold value without adding the dot count value to the count value.

In a second aspect of the present invention, a printing apparatus includes a printing unit configured to print an image by ejecting ink to a print medium, a recovery unit configured to be capable of executing a recovery operation for maintaining and recovering a favorable ink ejection performance of the printing unit, an obtainment unit configured to obtain a dot count value, which is the number of times ink is ejected during printing performed by the printing unit, and a printing time period, which is a time period required for the printing, and a control unit configured to control the execution of the recovery operation, based on a first count value and second count value, which are accumulated values of the dot count value, and a first threshold value and second threshold value for determining whether or not to execute the recovery operation to be performed by the recovery unit, wherein the control unit controls the execution of the recovery operation based on the first count value that has been updated to a value to which the dot count value is added and the first threshold value, and wherein, in a case when the recovery operation is not executed based on the first count value that has been updated to the value to which the dot count value is added and the first threshold value, in a case when a dot count value per unit time based on the dot count value and the printing time period is equal to or lesser than a predetermined value, the control unit updates the second count value to a value to which the dot count value is added, in order to control the execution of the recovery operation based on the updated second count value and the second threshold value, and, in a case when the dot count value per unit time is greater than the predetermined value, the control unit controls the execution of the recovery operation based on the second count value and the second threshold value without adding the dot count value to the second count value.

In a third aspect of the present invention, a control method for controlling a printing apparatus includes a printing unit configured to print an image by ejecting ink to a print medium and a recovery unit configured to be capable of executing a recovery operation for maintaining and recovering a favorable ink ejection performance of the printing unit, the control method includes an obtainment step for obtaining a dot count value, which is the number of times ink is ejected during printing performed by the printing unit, and a printing time period, which is a time period required for the printing, and a control step for controlling the execution of the recovery operation, based on a count value, which is an accumulated value of the dot count value, and a threshold value for determining whether or not to execute the recovery operation, wherein, in the control step, in a case when a dot count value per unit time based on the dot count value and the printing time period is equal to or less than a predetermined value, the count value is updated to a value to which the dot count value is added, in order to control the execution of the recovery operation based on the updated count value and the threshold value, and, in a case when the dot count value per unit time is greater than the predetermined value, the execution of the recovery operation is controlled based on the count value and the threshold value without adding the dot count value to the count value.

In a fourth aspect of the present invention, a control method for controlling a printing apparatus including a printing unit configured to print an image by ejecting ink to a print medium and a recovery unit configured to be capable of executing a recovery operation for maintaining and recovering a favorable ink ejection performance of the printing unit, the control method includes an obtainment step for obtaining a dot count value, which is the number of times ink is ejected during printing performed by the printing unit, and a printing time period, which is a time period required for the printing, and a control step for controlling the execution of the recovery operation, based on a first count value and second count value, which are accumulated values of the dot count value, and a first threshold value and second threshold value for determining whether or not to execute the recovery operation, wherein, in the control step, the execution of the recovery operation is controlled based on the first count value that has been updated to a value to which the dot count value is added and the first threshold value, and, in a case when the recovery operation is not executed based on the first count value that has been updated to the value to which the dot count value is added and the first threshold value, in a case when a dot count value per unit time based on the dot count value and the printing time period is equal to or less than a predetermined value, the second count value is updated to a value to which the dot count value is added, in order to control the execution of the recovery operation based on the updated second count value and the second threshold value, and, in a case when the dot count value per unit time is greater than the predetermined value, the execution of the recovery operation is controlled based on the second count value and the second threshold value without adding the dot count value to the second count value.

According to the present invention, it becomes possible to properly execute a recovery operation.

Further features of the present invention will become apparent from the following description of exemplary embodiments with reference to the attached drawings.

DESCRIPTION OF THE EMBODIMENTS

Hereafter, with reference to the accompanying drawings, detailed explanations are given of examples of an embodiment of a printing apparatus and a control method. Note that the following embodiments are not intended to limit the present invention, and every combination of the characteristics explained in the present embodiments is not necessarily essential to the solution in the present invention. Further, the positions, shapes, etc., of the constituent elements described in the embodiments are merely examples and are not intended to limit this invention to the range of the examples.

First Embodiment

First, with reference to FIG. 1 through FIG. 9, an explanation is given of a printing apparatus according to the first embodiment. The printing apparatus according to the present embodiment is an inkjet printing apparatus that prints an image on a print medium by ejecting ink based on print data. "Printing" not only indicates a case of forming meaningful information such as characters and figures, but also a case of forming meaningful or meaningless images, designs, patterns, etc., on print medium in a broad sense, or a case of processing the media, and whether or not being elicited so that a human can visually perceive does not matter.

<Configuration of the Printing Apparatus>

Figure 1:
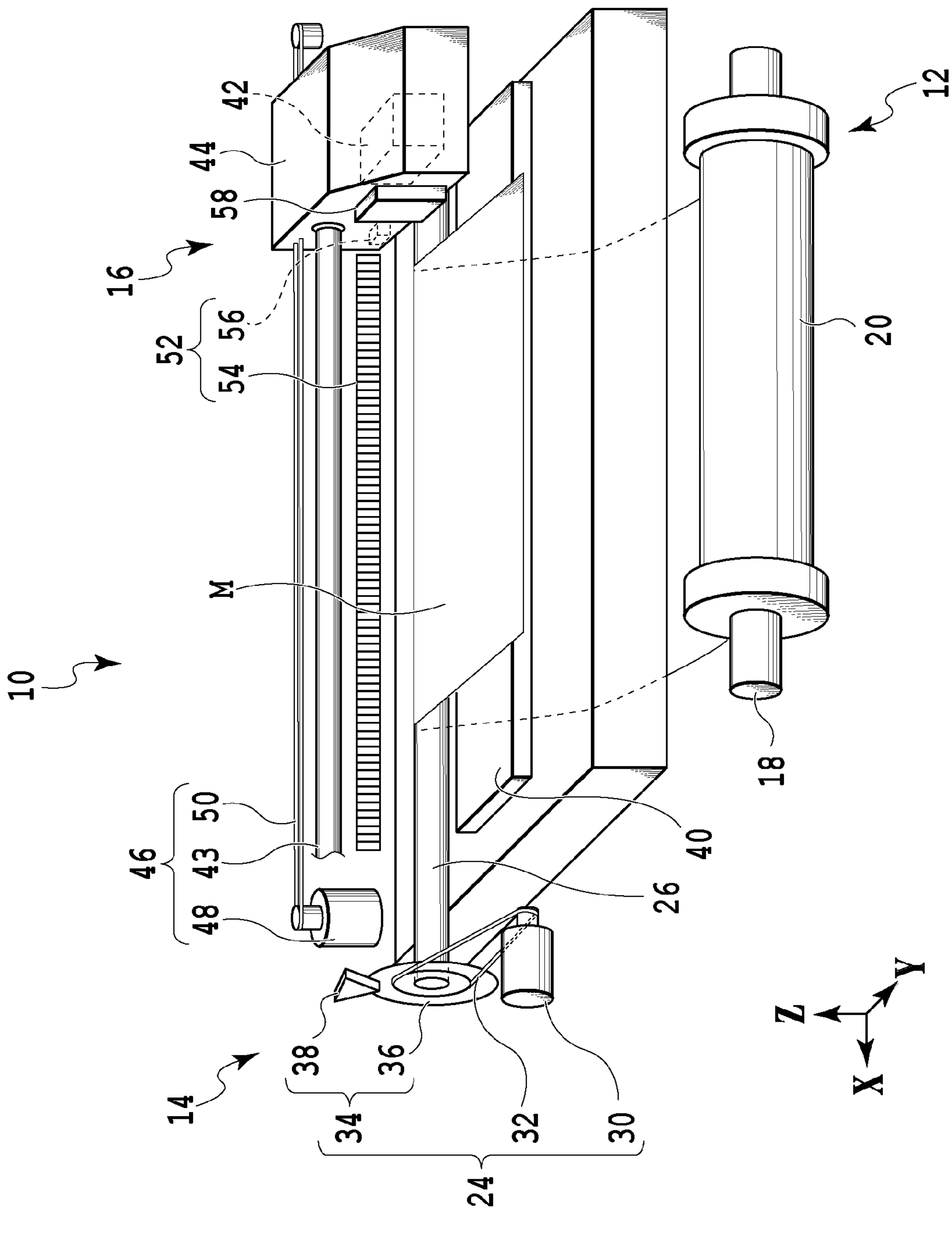
FIG. 1 is a schematic configuration diagram of a printing apparatus.
Figure 2:
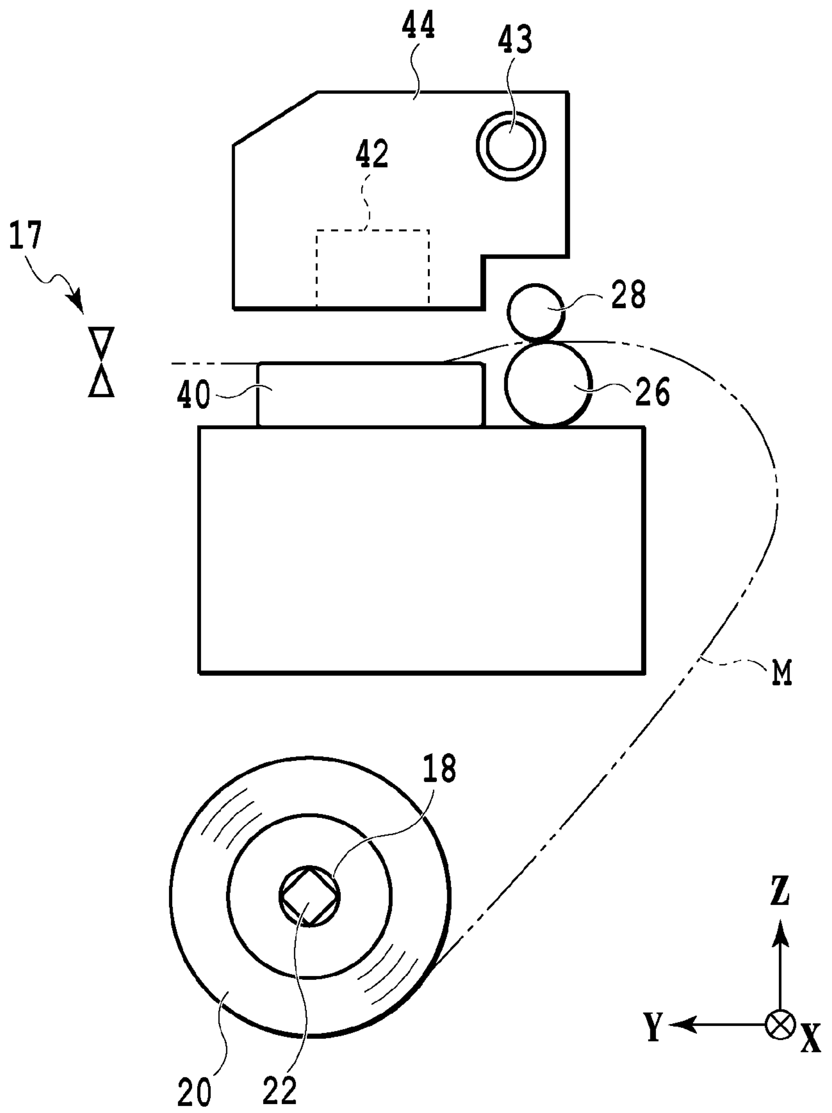
FIG. 2 is a side view of the main parts of the printing apparatus.

FIG. 1 is a schematic configuration diagram of the printing apparatus. FIG. 2 is a side view of the main parts of the printing apparatus.

The printing apparatus 10 includes the holding part 12 that holds a print medium, the conveyance part 14 that conveys the print medium held by the holding part 12, and the printing part 16 that performs printing by ejecting ink onto the print medium conveyed by the conveyance part 14. Further, the printing apparatus 10 also includes the cutting part 17 that cuts the print medium, on which printing has been performed by the printing part 16, along the X direction.

More specifically, the holding part 12 has a spool 18, which is installed in a rotatable manner. This spool 18 holds the roll 20, which is formed by winding the sheet-like print medium M. Note that the holding part 12 may be configured to hold a cut sheet as the print medium M. The spool 18 is equipped with the torque limiter 22 for braking the rotation of the spool 18. This torque limiter 22 applies tension to the print medium M unwound from the roll 20 and pulled out to the conveyance part 14.

The conveyance part 14 includes the conveyance roller 26, which rotates by the driving of the drive part 24, and the pinch roller 28, which is in pressure contact with the conveyance roller 26 so as to rotate in association with the rotation of the conveyance roller 26. Note that, in FIG. 1, illustration of the pinch roller 28 is omitted for ease of understanding. The drive part 24 includes the conveyance motor 30, which is a driving source, and the belt 32, which transmits the driving force of the conveyance motor 30 to the conveyance roller 26. Note that the configuration for transmitting the driving force of the conveyance motor 30 to the conveyance roller 26 is not limited to the configuration using the belt 32, and various publicly-known technologies may be applied. In the conveyance part 14, the print medium M is nipped by the conveyance roller 26 and the pinch roller 28, and the print medium Mis conveyed in the Y direction by the rotation of the conveyance roller 26.

The printing apparatus 10 includes the detection part 34 that is capable of detecting the rotation amount of the conveyance roller 26. The detection part 34 is a rotary encoder including the circular film 36, which is installed on the shaft of the conveyance roller 26, and the reading part 38, which is capable of reading a pattern formed on the circular film 36. A circular encoder pattern is drawn on the circular film 36. The reading part 38 is configured to be capable of optically, magnetically, or mechanically reading the encoder pattern formed on the circular film 36.

The printing part 16 includes the platen 40, which supports the print medium M conveyed by the conveyance part 14, and the print head 42, which ejects ink onto the print medium M supported by the platen 40. Further, the printing part 16 also includes the carriage 44, which is installed in a manner capable of performing sliding motion on the main rail 43 extending in the X direction. The carriage 44 is configured to be reciprocally movable in the X direction by the driving of the drive part 46. The print head 42 is mounted on the carriage 44. Accordingly, in the printing apparatus 10, the print head 42 is configured to be reciprocally movable in the X direction via the carriage 44.

The drive part 46 includes the carriage motor 48, which is a driving source, and the belt 50, which is connected to the carriage 44 and transmits the driving force of the carriage motor 48 to the carriage 44. The belt 50 is endlessly stretched around a pair of pulleys and extends so as to be parallel to the X direction. A shaft of the carriage motor 48 is connected to one of the pair of pulleys. Therefore, one of the pulleys is rotated by the driving of the carriage motor 48 so that the belt 50 runs, which allows the carriage 44 to be reciprocally movable in the X direction.

The printing apparatus 10 includes the detection part 52 capable of detecting the position of the carriage 44 in the X direction. By detecting the position of the carriage 44 in the X direction based on a detection result of the detection part 52, the printing position of the print head 42 mounted on the carriage 44, i.e., the ink ejection position, is controlled. The detection part 52 includes the encoder pattern 54, which extends so as to be parallel to the X direction, and the reading part 56, which is capable of optically, magnetically, or mechanically reading the encoder pattern 54. The reading part 56 is mounted on the carriage 44. Further, the printing apparatus 10 also includes the detection part 58 capable of detecting the end position of the print medium supported by the platen 40 in the X direction. The detection part 58 is mounted on the carriage 44 and detects the position of the end of the print medium supported by the platen 40 in the X direction as the carriage 44 moves.

Figure 3A:
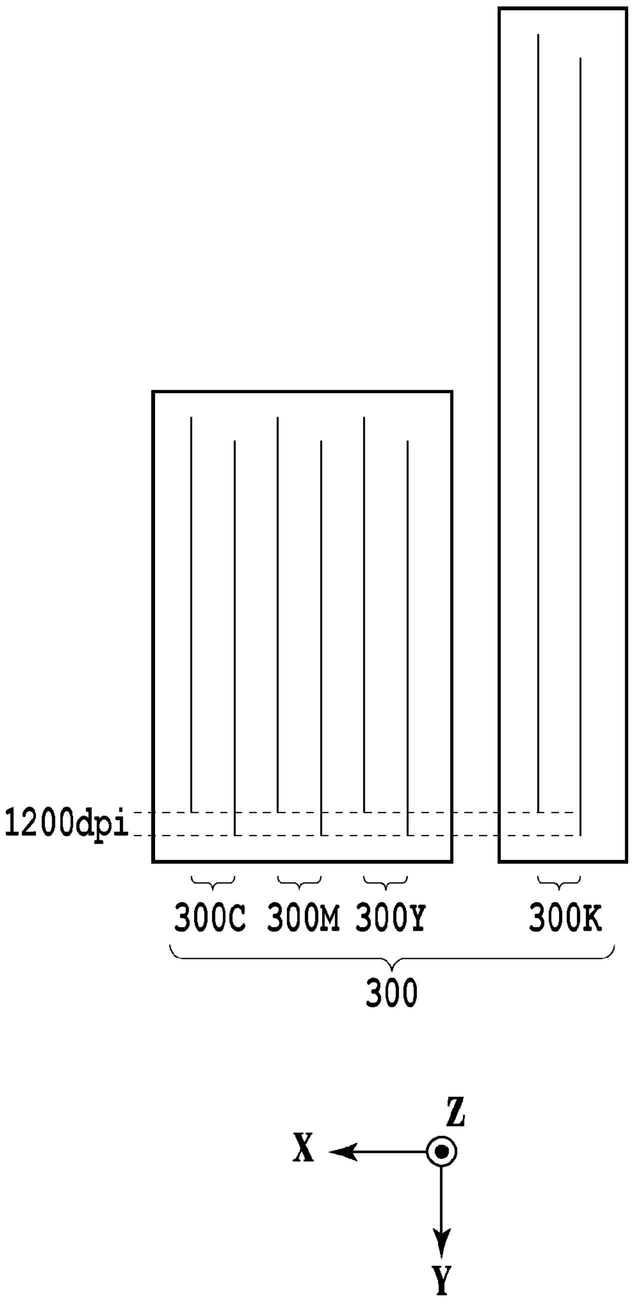
FIG. 3A and FIG. 3B are diagrams illustrating nozzle arrays formed on a nozzle surface of a print head.
Figure 3B:
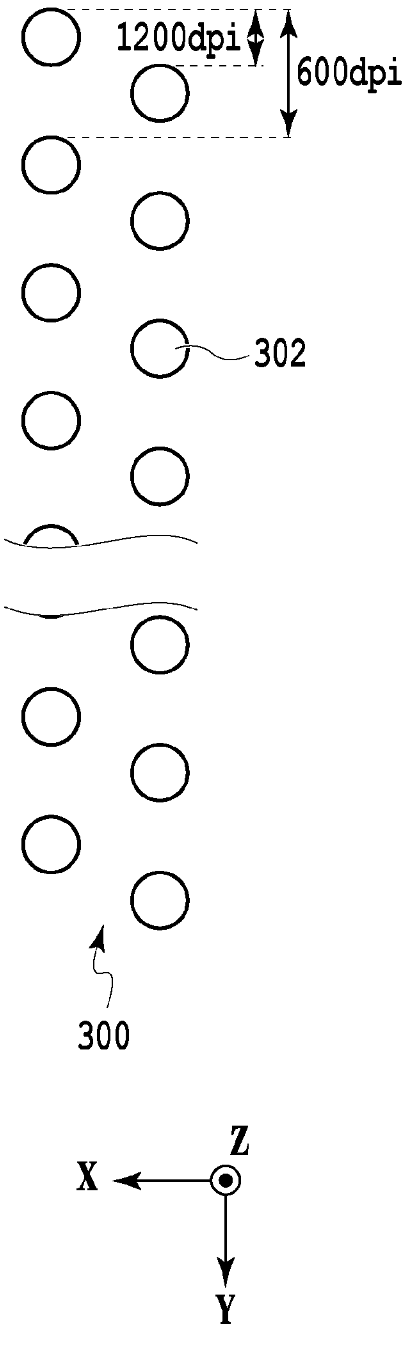

On the surface of the print head 42 facing the platen 40, the nozzles 302 (see FIG. 3A and FIG. 3B) for ejecting ink are formed. Further, the print head 42 is also equipped with the sensor 526 (see FIG. 5), which detects the temperature of the ink inside the print head 42, the heater 528 (see FIG. 5), which is controlled according to the temperature of the ink inside the print head 42 for heating the ink, etc. Hereafter, the "surface facing the platen 40" of the print head 42 is appropriately referred to as the "nozzle surface". FIG. 3A is a diagram illustrating nozzle arrays formed on the nozzle surface, and FIG. 3B is an enlarged view of nozzle arrays that eject predetermined ink. The print head 42 is capable of printing an image by ejecting multiple types of ink and is formed with the nozzle arrays 300, which are configured with multiple ink ejecting nozzles corresponding to the respective types of ink. Note that the types of ink include different colors, different pigments, different dyes, etc.

The print head 42 is configured to eject ink from nozzles by the driving of printing elements. Note that, for the print head 42, various kinds of publicly-known technologies can be used, such as a thermal system using heating elements as printing elements and a piezoelectric method using piezoelectric elements as printing elements. On the nozzle surface, in order along the −X direction, the nozzle array 300C that ejects cyan ink, the nozzle array 300M that ejects magenta ink, the nozzle array 300Y that ejects yellow ink, and the nozzle array 300K that ejects black ink are formed. In the nozzle arrays 300, as illustrated in FIG. 3B, nozzles for ejecting corresponding inks are formed so as to be arranged in a staggered pattern. Specifically, the nozzle arrays 300 are formed with pairs of nozzle groups. In each nozzle group, adjacent nozzles in the Y direction are arranged with an interval of 600 dpi. Further, in the nozzle arrays 300, the nozzle groups are formed with a deviation of 1200 dpi from each other in the Y direction. Further, each of the nozzle arrays 300C, 300M, and 300Y is configured with the 256 nozzles 302, and the nozzle array 300K is configured with the 640 nozzles 302.

Furthermore, in the printing apparatus 10, the print medium M conveyed by the conveyance part 14 is moved to the printing start position, and then the print operation, in which printing is performed by ejecting ink onto the print medium M while moving the print head 42 in the X direction, is performed. Next, the conveyance operation, in which the conveyance part 14 conveys the print medium M by a predetermined amount in the Y direction, is performed, and then the print operation is performed again after positioning an unprinted area at the position facing the nozzle plane of the print head 42. In this way, the printing apparatus 10 performs printing on the print medium M, based on print data, by alternately and repeatedly executing the print operation and the conveyance operation. Thereafter, the print medium M is cut by the cutting part 17 into each image corresponding to one page.

Figure 4:
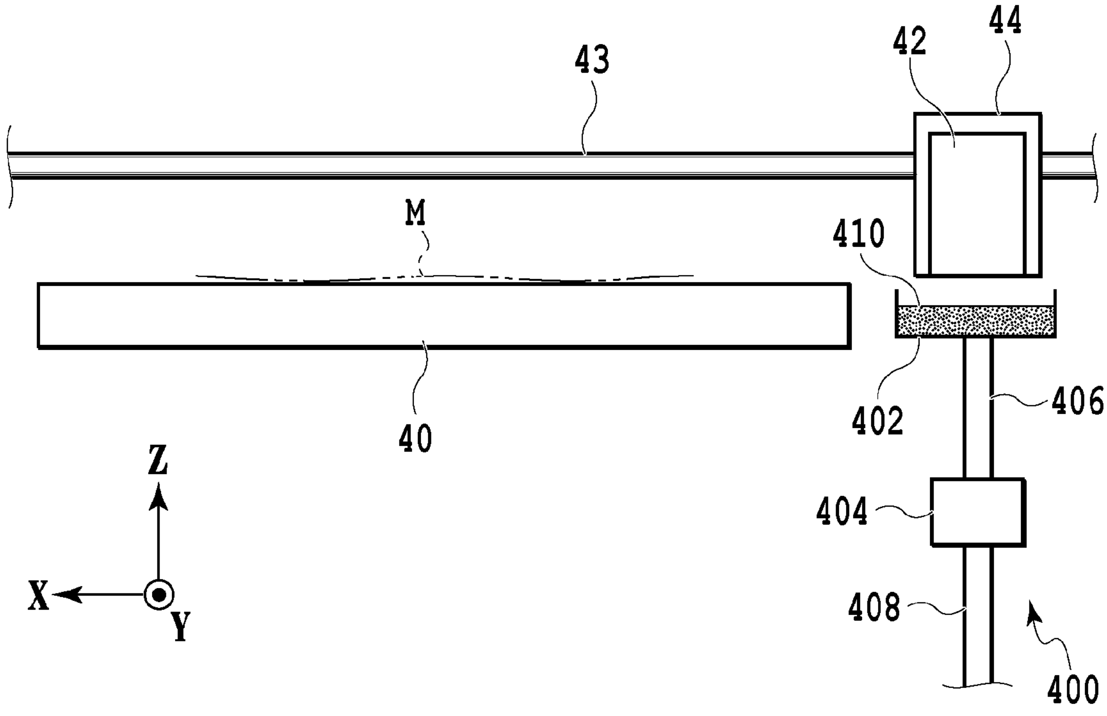
FIG. 4 is a schematic configuration diagram of the main parts of the printing apparatus including a recovery part.

Further, the printing apparatus 10 also includes the recovery part 400, which is capable of executing a recovery operation for maintaining and recovering a favorable ink ejection performance of each nozzle 302 of the print head 42. FIG. 4 is a schematic diagram illustrating the main parts of the printing apparatus including the recovery part. On the upstream side relative to the platen 40 in the +X direction, the recovery part 400 includes the cap 402, which caps and protects the nozzle surface of the print head 42, and the suction pump 404, which creates a negative pressure inside the cap 402. Note that the suction pump 404 is connected to the cap 402 via the tube 406. Further, the ink absorber 410 capable of absorbing ink is installed inside the cap 402. Further, although illustration in the drawings is omitted, the recovery part 400 includes various kinds of publicly-known configurations for maintaining and recovering a favorable ink ejection performance of the print head 42, such as a wiping mechanism for wiping the nozzle surface of the print head 42.

If the recovery operation using the cap 402 and the suction pump 404 is executed, the print head 42 is first moved to the standby position where the nozzle surface faces the cap 402. The standby position is a position where the platen 40 is not installed on the upstream side in the +X direction and is a position where the print head 42 stands by while printing is not performed. The cap 402 is configured to be movable between a capping position in which the nozzle surface of the print head 42 at the standby position is capped and a separation position (the position illustrated in FIG. 4) in which the cap 402 is separated from the nozzle surface. By capping the nozzle surface with the cap 402, evaporation of the solvent in the ink from the nozzles 302 can be suppressed. Note that the movement of the cap 402 and the driving of the suction pump 404 are controlled by the control part 500 (described later), which controls the operation of the printing apparatus 10.

In the print head 42, if ink is ejected from the nozzles 302 more than a certain number of times, there is a possibility that bubbles accumulate in the ink inside the print head 42. Further, in the print head 42, if the temperature of the ink inside the print head 42 is heated by the heater 528, the ink may evaporate and thicken, or solidify, inside the nozzles. As described above, if bubbles, thickening of ink, etc., occur in the print head 42, an ejection failure in which ink is not properly ejected from the nozzles 302 occurs. The recovery part 400 is utilized to eliminate such ejection failures. Specifically, for removing bubbles generated in the ink inside the print head 42, the suction pump 404 is driven in the state where the nozzle surface is capped with the cap 402, so as to suction the bubbles accumulated inside the print head 42 together with the ink from the print head 42 via the nozzles 302. Further, for removing thickened and solidified ink inside the nozzles, ink is ejected from the print head 42 into the cap 402 a predetermined number of times, so as to forcibly remove the thickened ink, etc., generated inside the nozzles. Note that, in the recovery part 400, the ink collected inside the cap 402 is collected by a maintenance cartridge (not illustrated in the drawings) via the waste ink tube 408 by use of the suction pump 404.

<Configuration of the Control System of the Printing Apparatus>

Figure 5:
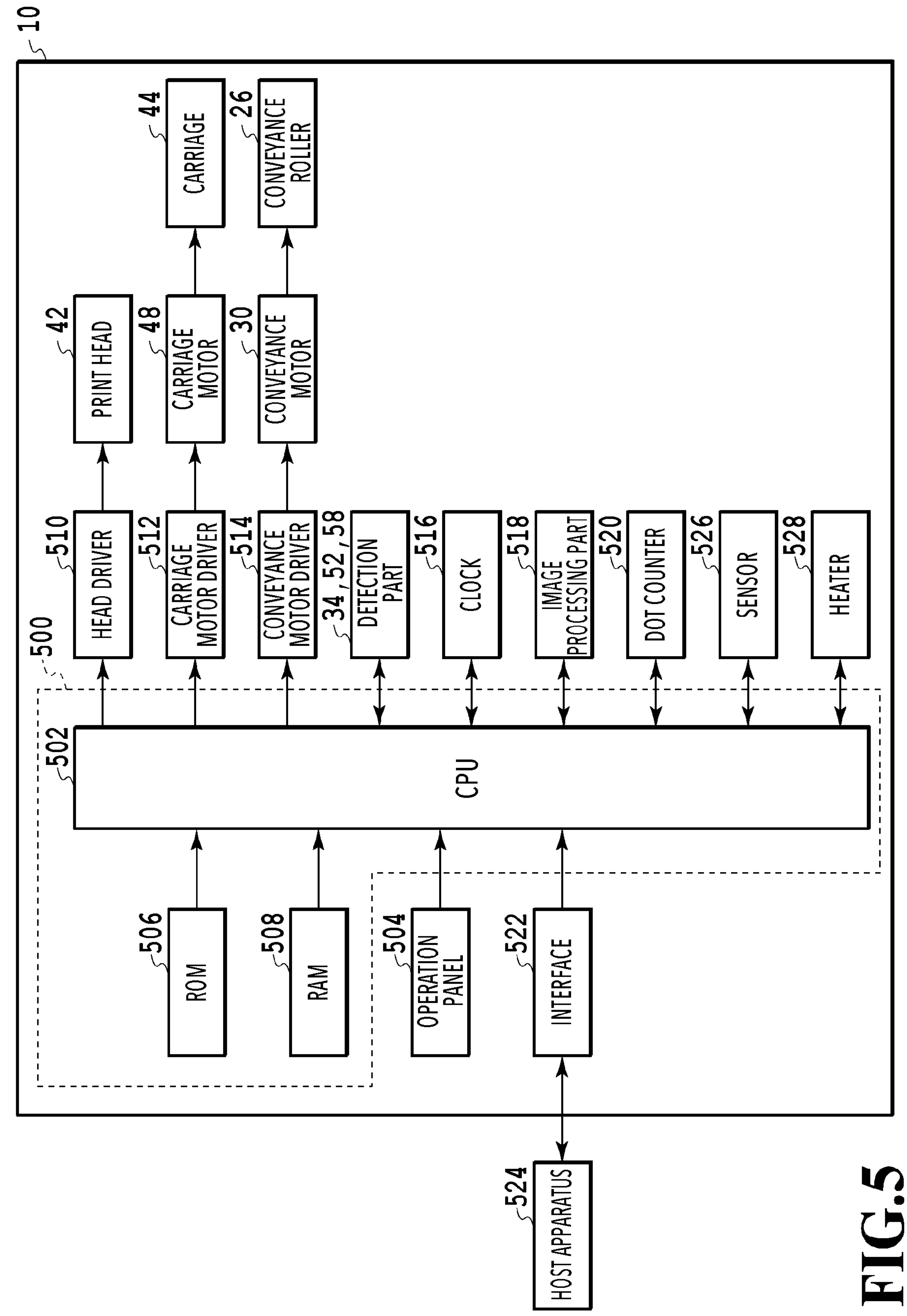
FIG. 5 is a block diagram illustrating a configuration of a control system of the printing apparatus.

Next, an explanation is given of the configuration of the control system of the printing apparatus 10. FIG. 5 is a block diagram illustrating the configuration of the control system of the printing apparatus.

The printing apparatus 10 includes the control part 500 that controls the overall operation of the printing apparatus 10. The control part 500 includes the CPU 502, the ROM 506, and the RAM 508. The CPU 502 reads out programs stored in the ROM 506 and controls the entire printing apparatus 10. The ROM 506 stores various kinds of programs to be executed by the CPU 502. The RAM 508 is used as a storage area for temporarily storing various kinds of information, such as print data, and also functions as a work area for the CPU 502. Although the ROM 506 and the RAM 508 are installed as storage devices in the present embodiment, there is not a limitation as such, and various kinds of publicly-known storage devices may be installed.

The CPU 502 is connected to the head driver 510 and controls the driving of the print elements in the print head 42 via the head driver 510 to control ejection of ink from each nozzle. Note that the printing elements are installed at positions corresponding to the nozzles, and the printing apparatus 10 is configured so that ink is ejected from the nozzles by the driving of the printing elements. Further, the CPU 502 is also connected to the carriage motor driver 512 and controls the driving of the carriage motor 48 via the carriage motor driver 512 to control movement of the carriage 44. Furthermore, the CPU 502 is connected to the conveyance motor driver 514 and controls the driving of the conveyance motor 30 via the conveyance motor driver 514 to control rotation of the conveyance roller 26.

The CPU 502 is connected to the detection parts 34, 52, and 58, and controls the rotation of the conveyance roller 26, the timings of ink ejection from the print head 42, the movement of the carriage 44, and the like, based on the detection results of each detection part. Further, the CPU 502 is also connected to the clock 516 and counts the passage of time with the clock 516. Furthermore, the CPU 502 is connected to the image processing part 518. The image processing part 518 performs image processing on image data that is input from the host apparatus 524 (described later), for example, to generate print data representing ejection and non-ejection of ink. The generated print data is stored in a storage area such as the RAM 508. Furthermore, based on this print data, the CPU 502 controls the conveyance roller 26, the print head 42, the carriage 44, etc., to perform printing on the print medium M. Furthermore, the CPU 502 is connected to the dot counter 520. Based on the print data, the dot counter 520 counts the number of driving times of the printing elements, i.e., the number of dots that are ink droplets ejected from the nozzles. The counted value (hereafter referred to as a "dot count value") is stored in a storage area such as the RAM 508. Note that the configuration for obtaining the dot count value is not limited to the configuration of performing calculation based on print data. Various publicly-known technologies, such as a configuration for obtaining the dot count value from a drive signal of a printing element, can be applied.

The CPU 502 is connected to the operation panel 504 and executes operations based on instructions that are input via the operation panel 504. The operation panel 504 is an input device that receives an input from the user, such as a touch panel. In this case, the CPU 502 controls the display contents to be displayed on the touch panel. Further, the CPU 502 is also connected via the interface 522 to the host apparatus 524, such as a personal computer, which is installed separately from the printing apparatus 10. For example, the host apparatus 524 creates image data and transmits the created image data to the printing apparatus 10 in response to an operation from the user. Note that the host apparatus 524 may also execute image processing on the image data to generate print data and transmit the generated print data to the printing apparatus 10. Furthermore, the CPU 502 is connected to the sensor 526, which is capable of detecting the temperature of ink inside the print head 42, and the heater 528, which is capable of heating the ink inside the print head 42. The CPU 502 controls the driving of the heater 528, based on a detection result of the sensor 526, to maintain the temperature of the ink inside the print head 42 within a certain range. As described above, in the present embodiment, the heater 528 functions as a heating part that heats the ink in the print head 42.

<Characteristic Technology of the Present Embodiment>

By the way, in an inkjet printing apparatus with a thermal system, thermal energy is used to eject ink from nozzles, and thus, depending on the operating environment, residual heat after ink ejection may cause bubbles in the ink inside the print head due to dissolved gas. Such bubbles are generated each time ink is ejected, and the generated bubbles accumulate in the ink inside the print head. Furthermore, if the ejection of ink is repeated a certain number of times or more ink ejection from the nozzles becomes unstable due to the bubbles accumulated inside the print head 42, which causes an ink ejection failure. Note that, in order to suppress the occurrence of such ejection failures, in a publicly-known technology such as Japanese Patent Laid-Open No. H2-141249, a recovery operation in which bubbles accumulated inside the print head are removed by suctioning is performed, based on the number of ink ejection times during printing, i.e., the dot count value.

Here, as a result of studies, the inventors of the present application found that the greater the dot count value per unit time is, the less likely the generated bubbles are to accumulate in the ink inside the print head. Therefore, based on the above-described finding, the recovery operation cannot be executed at appropriate timings in a publicly-known technology such as Japanese Patent Laid-Open No. H2-141249, which may result in an ejection failure or execution of unnecessary recovery operations that causes an increase in the ink consumption amount.

Therefore, in the present embodiment, whether or not to execute the recovery operation is determined by use of, not only the dot count value during a print operation, but also the printing time period, which is the time period required for the print operation. Specifically, based on the dot count value per unit time during a print operation and the threshold value Ath (predetermined value), whether or not to add the dot count value during the print operation to the count value C1, which is used for determining whether or not to execute the recovery operation, is determined. Furthermore, based on this count value C1 and the threshold value C1th, whether or not to execute the recovery operation after the print operation is determined.

Figure 6:
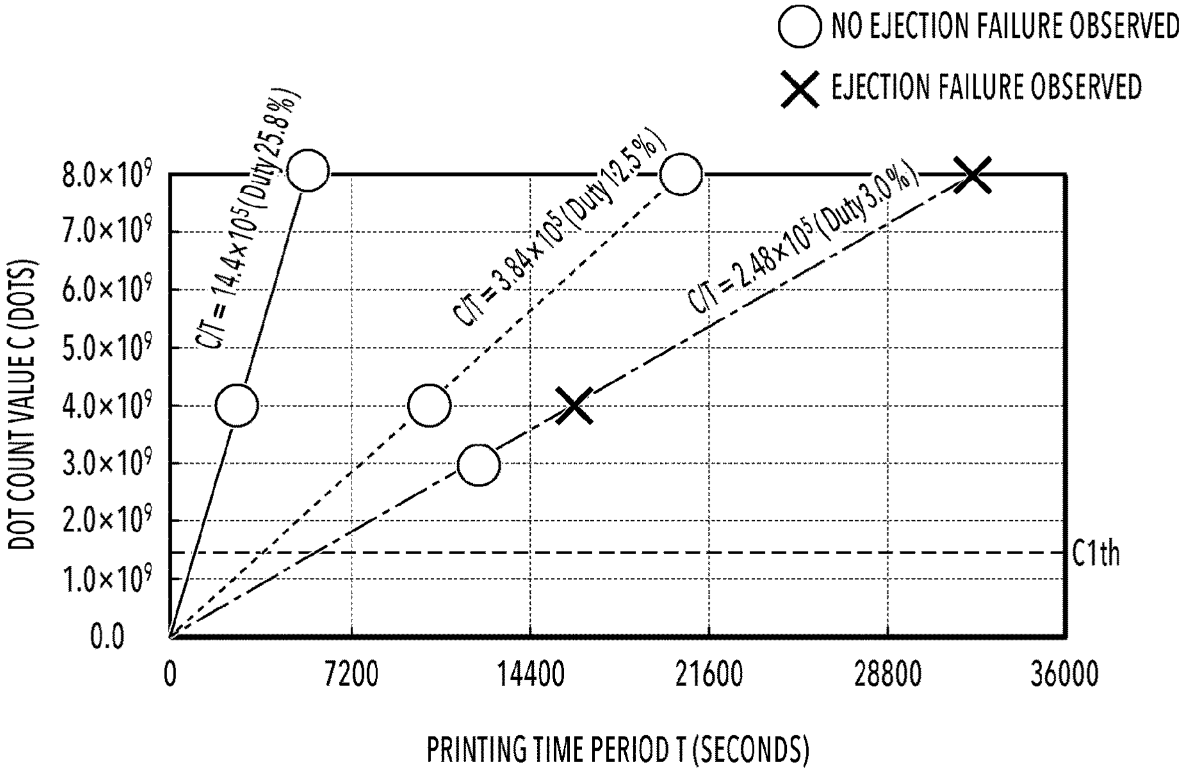
FIG. 6 is a graph illustrating occurrence of ejection failures in printing with different dot count values per unit time.

The threshold value Ath and the threshold value C1th are obtained by an experiment according to the ink to be used, the configuration of the print head 42, etc., as described below. FIG. 6 is a graph illustrating experimental results for obtaining the threshold value Ath and the threshold value C1th. In the graph of FIG. 6, the horizontal axis indicates the printing time period T, and the vertical axis indicates the dot count value C during printing.

The print medium used in the experiment for obtaining the threshold value Ath and the threshold value C1th was Canon Standard Plain Paper 2 LFM-PPS2/A1/64 (594×841 $mm^2$), and the image size was 584×831 $mm^2$. Further, the amount of one ink droplet ejected from a nozzle was set to 12 pl. Furthermore, evaluation patterns are printed after performing printing under three evaluation conditions with different printing duties (hereafter, simply referred to as "duties"), so that whether or not ejection failures have occurred in the printing results is determined. Note that, if the duties change, the ejection frequencies also change, which changes the generation of bubbles in the ink inside the print head. The evaluation patterns were solid images with a duty of 100%. Further, if faintness, streaks, and ink non-ejection were not confirmed in the printing results by visual observation, it was evaluated that no ejection failure has occurred, which is indicated as circle marks in the graph. Further, if faintness, streaks, and ink non-ejection were confirmed in the printing results by visual observation, it was evaluated that ejection failure has occurred, which is indicated as cross marks in the graph.

Duty is defined such that a duty of 100% is equal to 2 ink dots per 600 dpi. Further, the three evaluation conditions are a duty of 25.8% ($C/T=14.4\times10^5$), a duty of 12.5% ($C/T=3.84\times10^5$), and a duty of 3.0% ($C/T=2.48\times10^5$). In FIG. 6, the duty of 25.8% is indicated by the solid line, the duty of 12.5% is indicated by the dashed line, and the duty of 3.0% is indicated by the long dashed short dashed line.

As illustrated in FIG. 6, regarding the evaluation patterns after printing with the dot count value C being $8.0\times10^9$, an ejection failure was observed only in the case of the duty of 3.0% among the three evaluation conditions. Further, regarding the evaluation patterns after printing with the dot count value C being $4.0\times10^9$, an ejection failure was observed only in the case of the duty of 3.0% among the three evaluation conditions as well. Furthermore, in the case of the duty of 3.0%, no ejection failure was observed in the evaluation pattern after printing with the dot count value C being $3.0\times10^9$.

As described above, it is indicated that, if duties (dot count values C/T per unit time) are different, even with the same dot count value C (e.g., $4.0\times10^9$, $8.0\times10^9$), there are cases in which ejection failure occurs and in which ejection failure does not occur. CT (Computed Tomography) observation was performed on the print head after printing with the dot count value C being $4.0\times10^9$. As a result, in the print head after printing with the duty of 3.0%, generation and growth of bubbles were observed as compared with the print head before printing. On the other hand, in the print head after printing with the duty of 25.8% and the duty of 12.5%, significant generation and growth of bubbles were not observed as compared with the print head before printing.

According to the experimental results illustrated in FIG. 6, in the case of a configuration in which whether or not to execute the recovery operation is determined based only on the dot count value during a print operation as in the publicly-known technologies, if the threshold value C1th is $3.0\times10^9$, for example, the recovery operation is executed at a required timing in the case of the duty of 3.0%. On the other hand, in the case of the duty of 25.8% and the duty of 12.5%, the recovery operation is executed, even though printing is sufficiently continuable without causing ejection failures, which results in unnecessary ink consumption and a decrease in the printing speed. Further, if the duty becomes lower than 3.0%, the recovery operation cannot be executed properly.

Here, in FIG. 6, if the duty is equal to or less than a predetermined value between 12.5% and 3.0% (i.e., the dot count value per unit time is between $3.84\times10^5$ and $2.48\times10^5$), bubbles are likely to accumulate in the ink inside the print head. On the other hand, if the duty exceeds the predetermined value, bubbles are not likely to accumulate in the ink inside the print head.

In general, the lower the duty is, the less residual heat is generated by the thermal energy used for ink ejection, so that the temperature of the ink inside the print head does not rise, and thus the bubble generation amount decreases. On the other hand, the lower the duty is, the lesser the amount of ink ejected from the print head becomes, and thus the generated bubbles are not discharged, and accumulate in the ink inside the print head, so that the bubbles are likely to grow in the ink.

Therefore, based on these characteristics and the experimental results of FIG. 6, it is considered that, if the duty is equal to or less than a predetermined value, bubbles present inside the print head are less likely to be discharged to the outside of the print head together with ejected ink. On the other hand, it is considered that, if the duty exceeds the predetermined value, bubbles are likely to be generated inside the print head, but the generated bubbles are likely to be discharged to the outside of the print head together with ejected ink, and thus the bubbles are less likely to remain inside the print head.

Therefore, in the present embodiment, the threshold value Ath is set to $3.0\times10^5$, which is a dot count value per unit time between $3.84\times10^5$ and $2.48\times10^5$. Furthermore, in a case when the dot count value per unit time during a print operation is equal to or less than the threshold value Ath (equal to or less than a predetermined value), the dot count value in the print operation is added to the count value C1, which is used for determining whether or not to execute the recovery operation. Further, in a case when the dot count value per unit time during a print operation is greater than the threshold value Ath, the dot count value in the print operation is not added to the count value C1. Further, the threshold value C1th for determining whether or not to execute the recovery operation based on the count value C1 is, for example, set to a value smaller than a value at which it is confirmed that no ejection failure occurs in practice. That is, in the present embodiment, the threshold value C1th is set to $1.5\times10^9$, based on the experiment results of FIG. 6. That is, in consideration of the case when the dot count value C/T per unit time becomes less than $2.48\times10^5$ (the duty of 3.0%), the threshold value C1th is set to a value half of the dot count value $3.0\times10^9$ at which ejection failures do not occur in the case of the duty of 3.0%, for example. Note that, in the printing apparatus 10, in a case when the dot count value C/T per unit time does not become smaller than $2.48\times10^5$ (the duty of 3.0%), the threshold value C1th may be $3.0\times10^9$.

<Print Process>

With the above configuration, in the printing apparatus 10, the print process is executed if an instruction for starting printing is provided via the operation panel 504, the host apparatus 524, or the like. Note that, in the following explanation of the print process, it is assumed that image data is input to the printing apparatus 10 in advance, print data corresponding to one page is generated by the image processing part 518, the print data is divided for each print operation, and the divided print data is stored in the RAM 508. Further, it is also assumed that the print data divided for each print operation is stored in units of pages.

Figure 7:
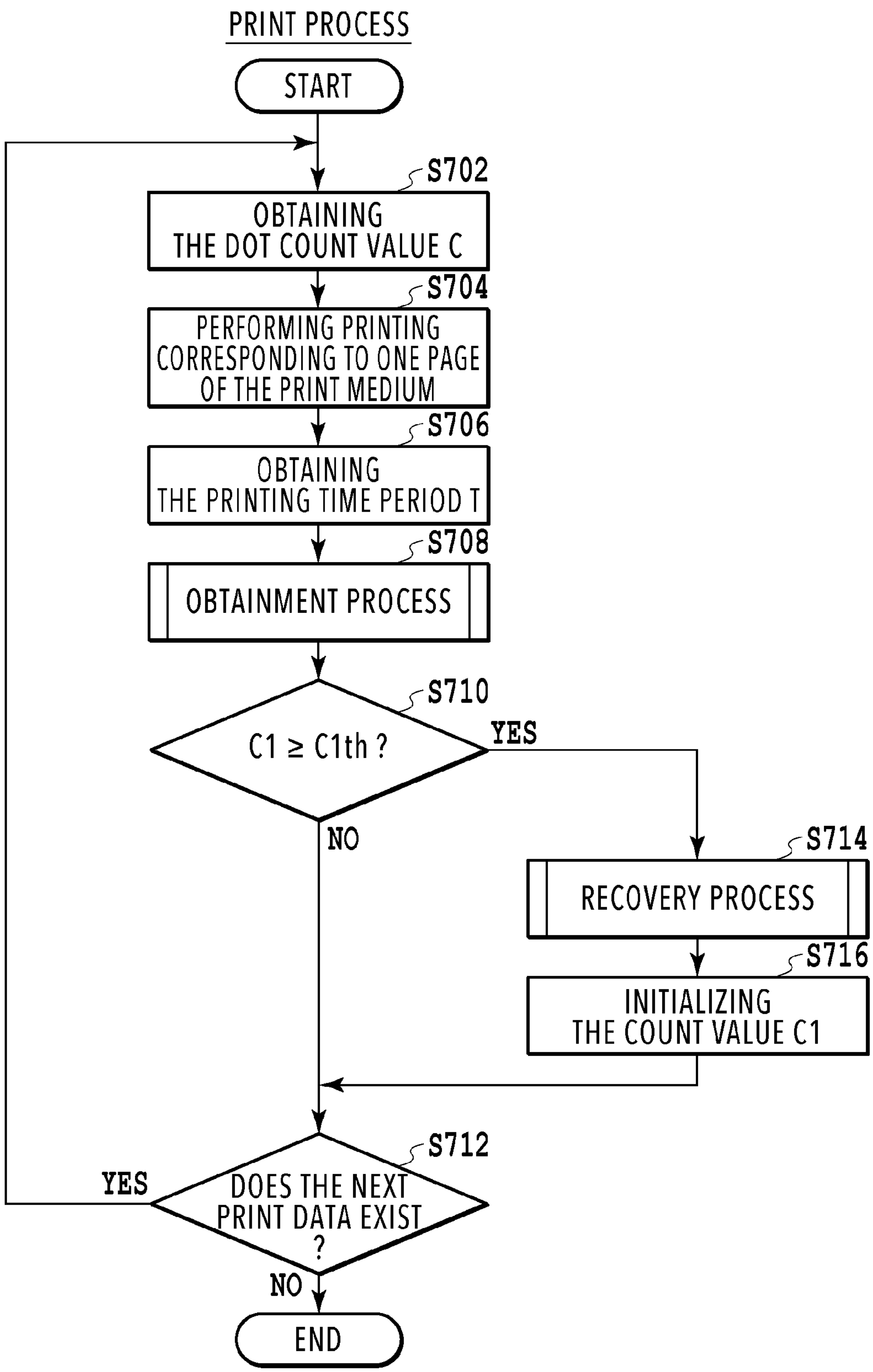
FIG. 7 is a flowchart illustrating a processing routine of a print process.
Figure 8:
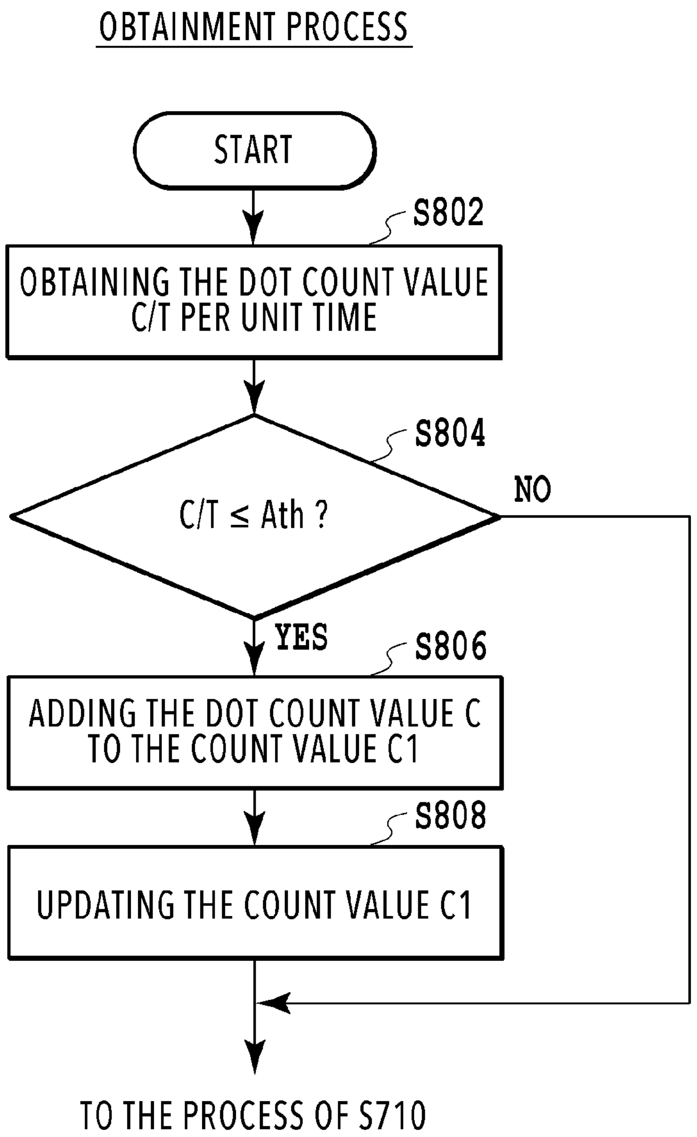
FIG. 8 is a flowchart illustrating a processing routine of an obtainment process, which is a subroutine of the print process.
Figure 9:
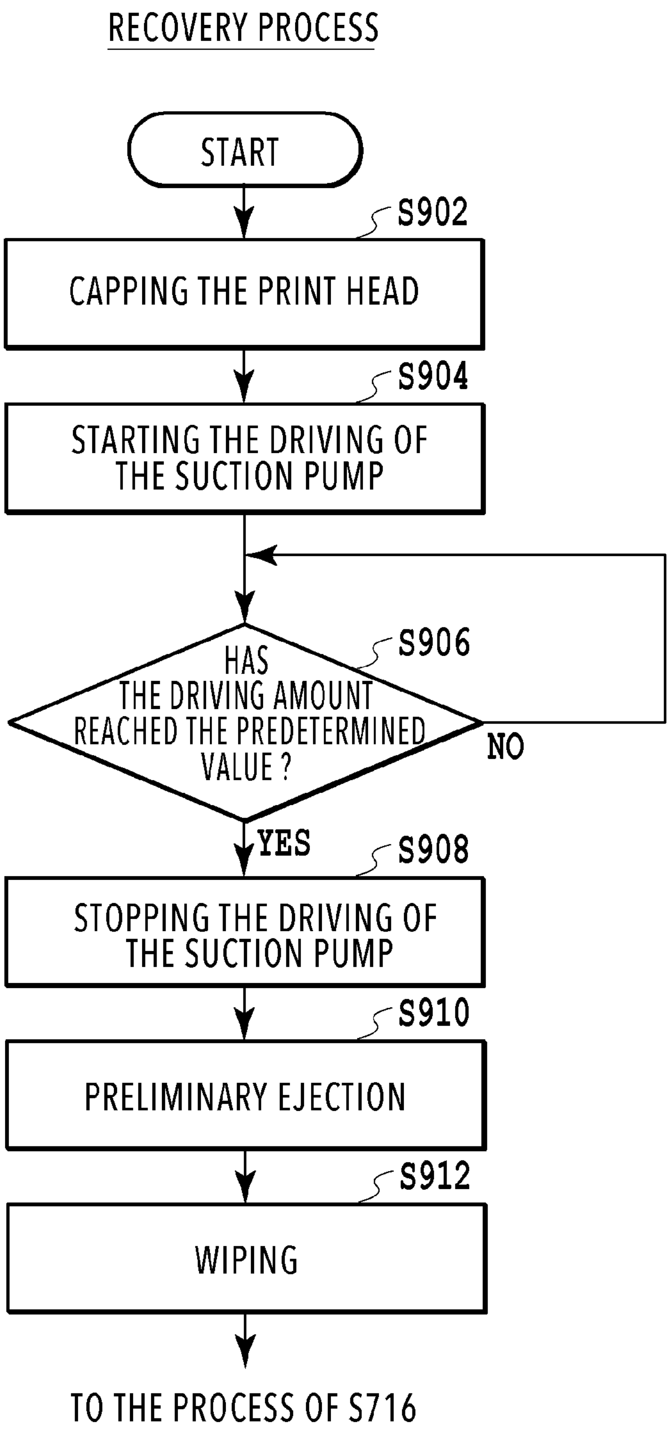
FIG. 9 is a flowchart illustrating a processing routine of a recovery process, which is a subroutine of the print process.

FIG. 7 is a flowchart illustrating a detailed processing routine of the print process. FIG. 8 is a flowchart illustrating a detailed processing routine of the obtainment process, which is a subroutine of the print process. FIG. 9 is a flowchart illustrating a detailed processing routine of the recovery process, which is a subroutine of the print process. The series of the processes illustrated in the flowcharts of FIG. 7 through FIG. 9 is performed by the CPU 502 loading a program code stored in the ROM 506 into the RAM 508 and executing the program code. Alternatively, a part of or all of the functions in the steps of FIG. 7 through FIG. 9 may be executed by hardware such as an ASIC or an electronic circuit. Note that the symbol "S" in the explanation of each process means that it is a step in the flowchart. Hereafter, the same applies to the present specification.

If the print process is started, first, the CPU 502 obtains the number of ink ejection times for printing of an image corresponding to one page of the print medium (S702). In S702, based on the print data stored in the RAM 508, the dot counter 520 calculates the number of ink ejection times for printing of an image corresponding to one page of the print medium, i.e., the dot count value C. Note that the dot count value C is calculated for each type of ink that can be ejected from the print head 42, i.e., for each of the four colors of ink in the present embodiment.

Next, the CPU 502 performs printing based on the print data stored in the RAM 508 (S704). In S704, the image corresponding to one page of the print medium is printed. Further, in S704, the clock 516 counts the time period from the start to the end of the print operation. That is, the time period required for multiple times of print operations that are executed for printing the image corresponding to one page is counted. Therefore, the time period counted by the clock 516 is the printing time period T, which is the time period required for the print operation. Note that, in a case of a configuration in which the dot counter 520 counts the dot count value based on a drive signal of a printing element, etc., the process of S702 is omitted, and, in S704, the CPU 502 obtains the dot count value C for each type of ink by use of the dot counter 520. Further, the print medium M, on which the image corresponding to one page is printed, is to be cut at a predetermined position by the cutting part 17.

After the printing corresponding to one page of the print medium ends, the CPU 502 then obtains the printing time period T (S706), which is the time period counted by the clock 516, and performs the obtainment process for obtaining the counted value C1, which is used for determining whether or not to execute the recovery operation (S708). The count value C1 is an accumulated value of dot count values C during the time of printing and is stored in a storage area such as the RAM 508 for each type of ink, and its initial value is "0". Note that, in a case when the dot count value C is obtained by the dot counter 520 in S704, the dot count value C is obtained for each type of ink in S706. As described above, in the present embodiment, the CPU 502 (the control part 500) functions as an obtainment part that obtains the dot count value C and the printing time period.

In S708, the obtainment process illustrated in FIG. 8 is executed. In this obtainment process, the count value C1 is obtained for each type of ink. If the obtainment process is started, first, the CPU 502 obtains the dot count value C/T per unit time (S802). In S802, the dot count value C (obtained in S702 or S706) is divided by the printing time period T (obtained in S706) to obtain the dot count value C/T per unit time.

Next, the CPU 502 determines whether or not the dot count value C/T per unit time is equal to or less than the threshold value Ath (S804). The threshold value Ath is stored in a storage area such as the RAM 508. Further, the threshold value Ath may be set for each type of ink or may be set to a value common to the respective inks. That is, the threshold value Ath is set according to the characteristics of the inks to be used. If it is determined in S804 that the dot count value C/T per unit time is equal to or less than the threshold value Ath, the CPU 502 adds the dot count value C (obtained in S702 or S706) to the count value C1 (S806). Thereafter, the CPU 502 updates the count value C1 stored in the storage area to the value obtained in S806 and the processing proceeds to S710, which is described later.

Further, if it is determined in S804 that the dot count value C/T per unit time is not equal to or less than the threshold value Ath, i.e., exceeds the threshold value Ath, the processing proceeds to S710, which is described later. That is, in a case when the dot count value C/T per unit time exceeds the threshold value Ath, the dot count value C in the print operation executed in S704 is not added to the count value C1. That is, the dot count value C is ignored.

Returning to FIG. 7, the explanation is continued. If the obtainment process ends, the processing proceeds to S710, and the CPU 502 determines whether or not the count value C1 is equal to or greater than the threshold value C1th. The threshold value C1th is stored in a storage area such as the RAM 508. Further, the threshold value C1th may be set for each type of ink or may be set to a value common to the respective inks. That is, the threshold value C1th is set according to the characteristics of the inks to be used. In S710, if the count value C1 is equal to or larger than the threshold value C1th for at least one of the inks, it is determined that the count value C1 is equal to or greater than the threshold value C1th. Further, if the count value C1 is less than the threshold value C1th for all of the inks, it is determined that the count value C1 is not equal to or greater than the threshold value C1th.

If it is determined in S710 that the count value C1 is not equal to or greater than the threshold value C1th, the CPU 502 determines whether or not the next print data, i.e., print data for the next page, exists (S712). If it is determined in S712 that the next print data does not exist, this print process ends, and, if it is determined that the next print data exists, the processing returns to S702.

On the other hand, if it is determined in S710 that the count value C1 is equal to or larger than the threshold value C1th, the recovery process is executed to perform the recovery operation for removing the bubbles generated in the ink inside the print head (S714), the count value C1 is initialized (S716), and then the processing proceeds to S712. In S716, the count value C1 corresponding to each ink is set to "0". As described above, in the present embodiment, the CPU 502 functions as a control part that controls execution of the recovery operation. In S714, the recovery process illustrated in FIG. 9 is executed.

If the recovery process is executed, the CPU 502 first caps the nozzle surface of the print head 42 with the cap 402 (S902). In S902, the print head 42 is first moved to the standby position where the nozzle surface thereof faces the cap 402, which is at the separated position, and then the cap 402 is moved from the separated position to the capping position. Next, the CPU 502 starts driving the suction pump 404 (S904) and determines whether or not the driving amount of the suction pump 404 has reached a predetermined amount (S906). The printing apparatus 10 is configured with the control part 500 that can detect the drive rotation amount or driving time period of the suction pump 404. Therefore, in S904, if the driving of the suction pump 404 is started, the measurement of the drive rotation amount or the driving time period of the suction pump 404 is started. Furthermore, in S906, whether or not the drive rotation amount or driving time period of the suction pump 404 has reached the predetermined value is determined.

If it is determined in S906 that the drive amount of the suction pump 404 has not reached the predetermined amount, the processing returns to S906. If it is determined in S906 that the drive amount of the suction pump 404 has reached the predetermined amount, the CPU 502 stops driving the suction pump 404 (S908). Next, the CPU 502 performs preliminary ejection, which is ink ejection that does not contribute to printing, to the cap 402 (S910). In S910, the preliminary ejection may be performed in the state where the nozzle surface of the print head 42 is capped with the cap 402, or the preliminary ejection may be performed in the state where the cap 402 is separated from the nozzle surface. Thereafter, a wiping mechanism (not illustrated in the drawings) wipes the nozzle surface of the print head 42 in the state of being separated from the cap 402 (S912), and the processing proceeds to S716.

As explained above, in the printing apparatus 10, in a case when the dot count value C/T per unit time during the time of a print operation is greater than the threshold value Ath, the dot count value C during the time of the print operation is not added to the count value C1, which is used for making a determination about execution of the recovery operation. Note that the threshold value Ath is a threshold value for determining whether or not bubbles accumulate in the ink inside the print head in the printing.

Accordingly, in such printing where bubbles do not accumulate in the ink inside the print head 42, the dot count value during the time of the print operation is ignored, and only the dot count value C during the time of such a print operation where bubbles accumulate in the ink inside the print head 42 is reflected in the count value C1. Therefore, in the printing apparatus 10, the recovery operation can be executed at proper timings, so that the ink consumption amount can be suppressed, and the occurrence of ejection failure can be suppressed.

Second Embodiment

Figure 10:
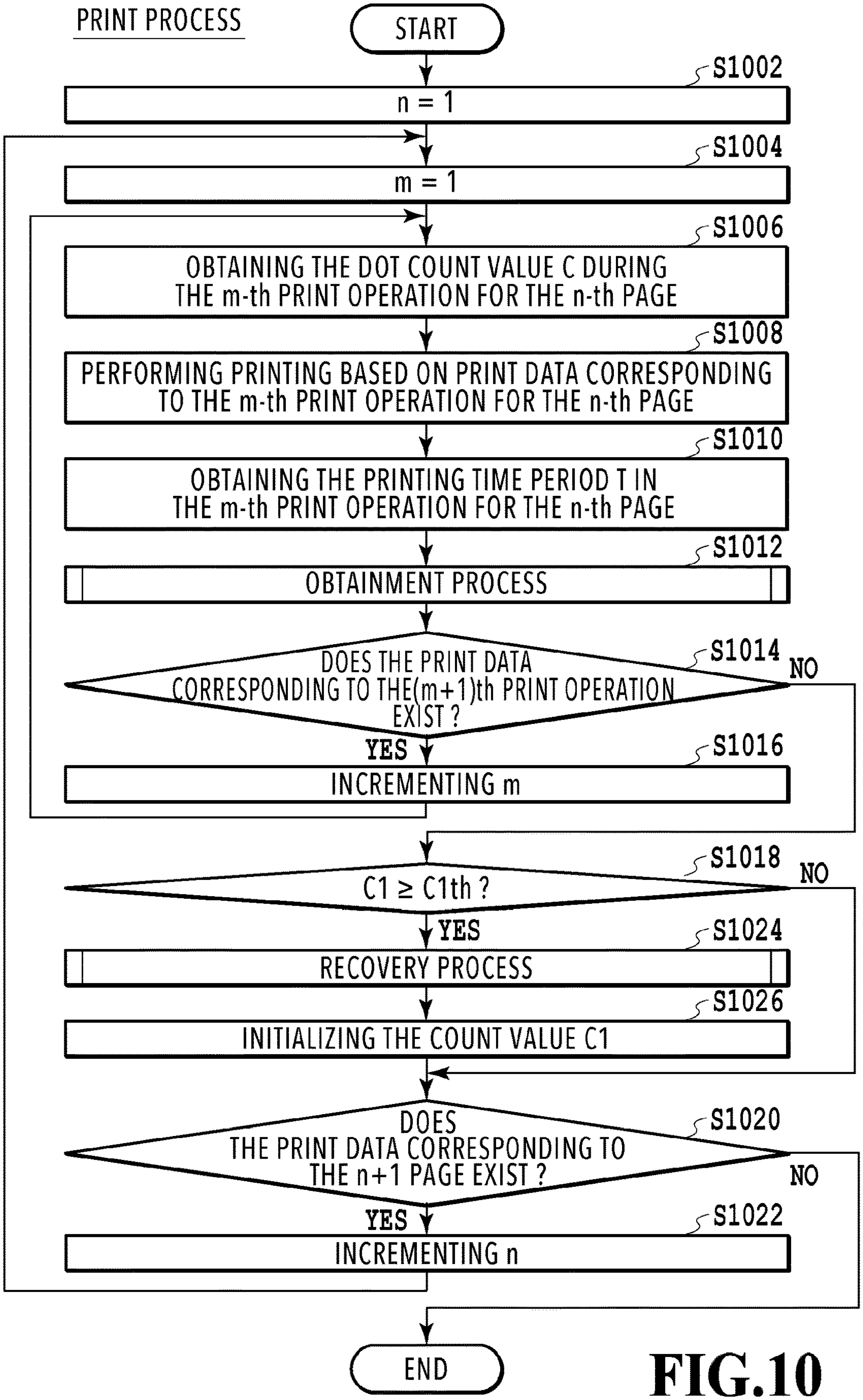
FIG. 10 is a flowchart illustrating a processing routine of a print process of another embodiment.

Next, with reference to FIG. 10, an explanation is given of the printing apparatus according to the second embodiment. Note that, in the following explanation, the same or corresponding configurations as those of the printing apparatus according to the first embodiment described above are assigned with the same signs as those used in the first embodiment, so as to omit detailed explanations thereof.

The second embodiment is different from the above-described first embodiment in the aspect of obtaining the dot count value C and the printing time period T of one movement of the print head 42 associated with printing in the X direction. As described above, the printing apparatus 10 alternately and repeatedly performs a print operation of ejecting ink while moving the print head 42 in the X direction and a conveyance operation of conveying the print medium M in the Y direction by a predetermined amount, so as to print an image on the print medium M. Therefore, in the first embodiment, the dot count value C at the point in time where an image corresponding to one page is printed by performing the print operation multiple times and the printing time period T required for the multiple times of print operations are obtained. On the other hand, in the second embodiment, the dot count value C at the point in time where a predetermined area of an image corresponding to one page is printed by performing the print operation once and the printing time period T required for the one print operation are obtained.

<Print Process>

An explanation is given of the print process executed by the printing apparatus 10 according to the present embodiment. FIG. 10 is a flowchart illustrating a detailed processing routine of the print process executed by the printing apparatus 10 according to the present embodiment. The series of the processes illustrated in the flowchart of FIG. 10 is performed by the CPU 502 loading a program code stored in the ROM 506 into the RAM 508 and executing the program code. Alternatively, a part of or all of the functions in the steps of FIG. 10 may be executed by hardware such as an ASIC or an electronic circuit.

If the print process is started, first, the CPU 502 sets the variable n representing the page number to "1" (1002) and sets the variable m representing the number of print operations to 1 (S1004). Print data corresponding to one page stored in the RAM 508 is numbered in order for each page. Further, in the RAM 508, print data corresponding to one page is divided for each print operation. Furthermore, each print data corresponding to one print operation is numbered according to the order of the printing for the image corresponding to one page.

Next, the number of ink ejection times for printing in the m-th print operation for the n-th page is obtained (S1006). In S1006, based on the print data corresponding to the m-th print operation for the n-th page, the dot counter 520 calculates the number of ink ejections, i.e., the dot count value C, during the time of the m-th print operation for the n-th page for each type of ink. Further, the CPU 502 performs printing based on the print data corresponding to the m-th print operation for the n-th page (S1008). In S1008, the clock 516 counts the time period from the start to the end of the m-th print operation for the n-th page. That is, the time period required for one print operation is counted. Therefore, the time period counted by the clock 516 is the printing time period T, which is the time period required for the m-th print operation for the n-th page. Note that, in a case of a configuration in which the dot counter 520 counts the dot count value based on a drive signal of a printing element, etc., the process of S1006 is omitted, and, in S1008, the CPU 502 counts the dot count value C for each type of ink by use of the dot counter 520.

After the m-th print operation for the n-th page ends, the CPU 502 then obtains the printing time period T (S1010), which is the time period counted by the clock 516, and performs the obtainment process to obtain the count value C1 (S1012). Note that, in a case when the dot count value C is obtained by the dot counter 520 in S1008, the dot count value C for each type of ink is also obtained in S1010.

In the obtainment process of S1012, the count value C1 is obtained for each type of ink by the same processing procedure as in FIG. 8. That is, if the obtainment process is started, first, in S802, the CPU 502 obtains the dot count value C/T per unit time. The dot count value C (obtained in S1006 or S1008) is divided by the printing time period T (obtained in S1008) to obtain the dot count value C/T per unit time. Next, in S804, the CPU 502 determines whether or not $C/T \leq Ath$ is satisfied, and, if it is determined that $C/T \leq Ath$ is not satisfied, the processing proceeds to S1014, which is described later. Further, if it is determined in S804 that $C/T \leq Ath$ is satisfied, the dot count value C is added to the count value C1 in S806, the stored count value C1 is updated in S808 to the value obtained in S806, and the processing proceeds to S1014.

Returning to FIG. 10, the explanation is continued. Thereafter, in S1014, the CPU 502 determines whether or not print data corresponding to the (m+1)th print operation exists, and, if it is determined that print data corresponding to the (m+1)th print operation exists, the CPU 502 increments the variable m (S1016), and the processing returns to S1006. Further, if it is determined in S1014 that (m+1)th print data does not exist, the CPU 502 determines whether or not the count value C1 is equal to or greater than the threshold value C1th (S1018). In S1018, if the count value C1 is equal to or greater than the threshold value C1th for at least one of the inks, it is determined that the count value C1 is equal to or greater than the threshold value C1th. Further, if the count value C1 is less than the threshold value C1th for all of the inks, it is determined that the count value C1 is not equal to or greater than the threshold value C1th. If it is determined in S1018 that the count value C1 is not equal to or greater than the threshold value C1th, the CPU 502 determines whether or not print data for the (n+1)th page exists (S1020). If it is determined that print data for the (n+1)th page exists, the variable n is incremented (S1022) and the processing returns to S1004.

On the other hand, if it is determined in S1018 that the count value C1 is equal to or greater than the threshold value C1th, the recovery process is executed to perform the recovery operation for removing the bubbles generated in the ink inside the print head (S1024), the count value C1 is initialized (S1026), and then the processing proceeds to S1020. Note that, since the specific details of processing of S1024 and S1026 are the same as those of S714 and S716, the explanations thereof are omitted.

As explained above, whereas the count value C1 is updated in units of print operations for printing an image corresponding to one page in the above-described first embodiment, the counted value C1 is updated on a per print operation basis in the present embodiment. As described above, in the present embodiment, since the update of the count value C1 is executed in finer units than in the above-described first embodiment, it is possible to execute the recovery operation at more proper timings than in the above-described first embodiment.

Third Embodiment

Figure 11:
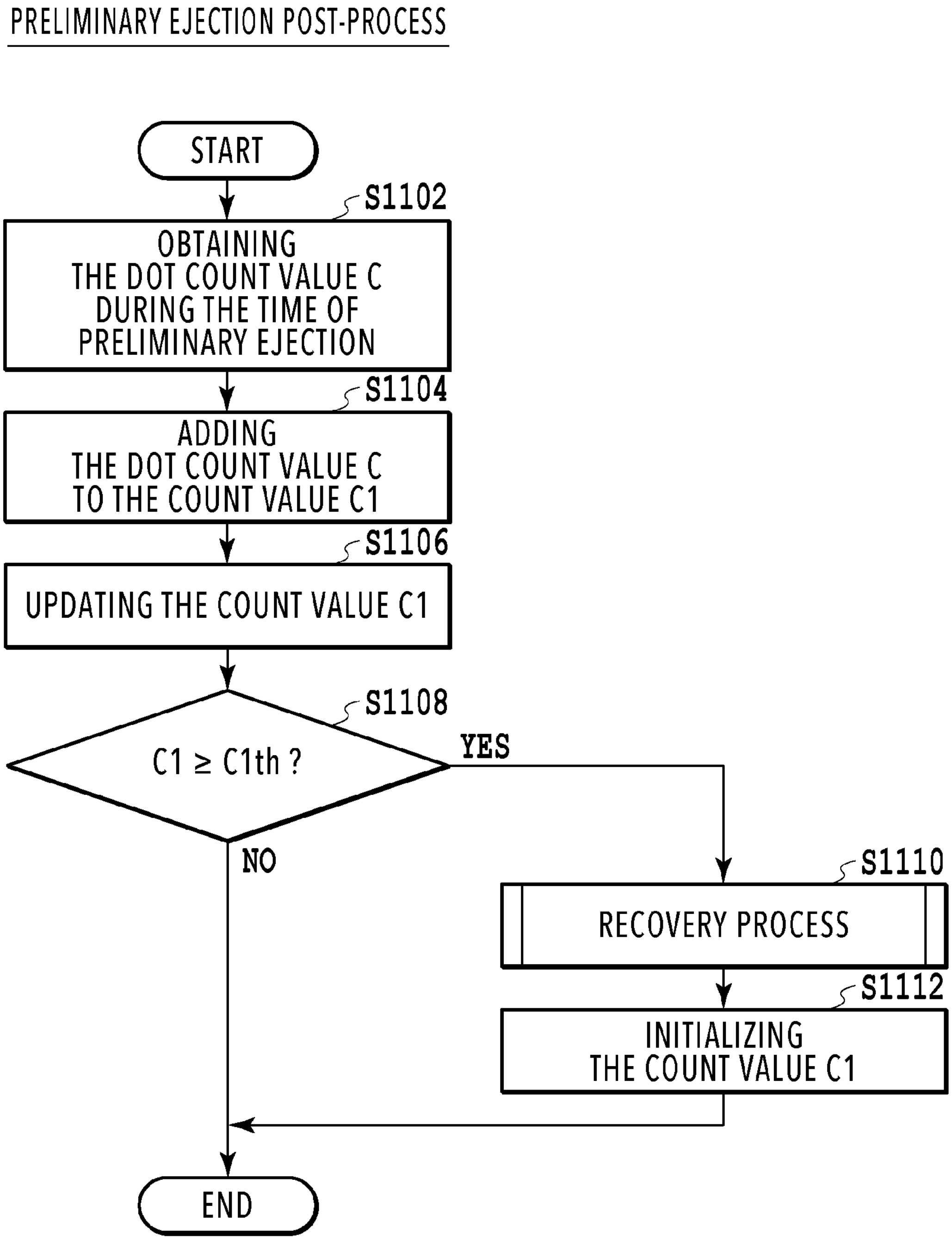
FIG. 11 is a flowchart illustrating a processing routine of a preliminary ejection post-process.

Next, with reference to FIG. 11, an explanation is given of the printing apparatus according to the third embodiment. Note that, in the following explanation, the same or corresponding configurations as those of the printing apparatus according to the first embodiment described above are assigned with the same signs as those used in the first embodiment, so as to omit detailed explanations thereof.

In the printing apparatus 10, in order to suppress the occurrence of ink ejection failure due to the ink temperature, the print head 42 includes the sensor 526, which is capable of detecting the temperature of the ink inside the print head 42, and the heater 528, which is capable of heating the ink. Further, in the printing apparatus 10, the heater 528 is driven based on detection results of the sensor 526 and controlled so as to keep the ink temperature inside the print head 42 within a certain range. However, if the ink inside the print head is heated by the heater 528, in a case when the ink is not ejected or when the number of ink ejection times is low, the liquid component of the ink evaporates from the nozzles so that thickening and solidification of the ink inside the nozzles are facilitated, which may cause ejection failure. Therefore, in order to suppress the thickening, etc., of the ink inside the nozzles, preliminary ejection, which is ink ejection that does not contribute to printing, is executed into the cap 402 at a predetermined timing. Note that, even during this preliminary ejection, residual heat after ink ejection causes bubbles in the ink due to dissolved gas, and the bubbles accumulated inside the print head 42 grow.

Therefore, in the third embodiment, the dot count value C during the time of preliminary ejection is obtained, and the obtained dot count value C is reflected in the count value C1, so that whether or not to execute the recovery operation is determined based on this count value C1 and the threshold value C1th. Note that the preliminary ejection is executed at a timing according to the driving time period of the heater 528. If this timing is during the time of a print operation, for example, the preliminary ejection is executed after the print operation being executed ends, and, after the preliminary ejection is executed, the next print operation is to be executed. Note that, for the specific operation contents of the preliminary ejection, publicly-known technologies can be applied, and thus detailed explanations thereof are omitted.

Therefore, in the following explanation, an explanation is given of the preliminary ejection post-process, which is executed in a routine separate from the processing routine in the print process after preliminary ejection.

<Preliminary Ejection Post-Process>

In the printing apparatus 10, after preliminary ejection ends, the preliminary ejection post-process is started. FIG. 11 is a flowchart illustrating a detailed processing routine of the preliminary ejection post-process. The series of the processes illustrated in the flowchart of FIG. 11 is performed by the CPU 502 loading a program code stored in the ROM 506 into the RAM 508 and executing the program code. Alternatively, a part or all of the functions in the steps of FIG. 11 may be executed by hardware such as an ASIC or an electronic circuit.

If the preliminary ejection post-process is started, first, the CPU 502 obtains the dot count value (preliminary ejection dot count value) C, which is the number of ink ejection times during preliminary ejection, for each type of ink (S1102). The dot count value C for preliminary ejection is obtained by the dot counter 520 in the same manner as with the dot count value for a print operation, for example. In the present embodiment, it is assumed that preliminary ejection of 13 droplets at intervals of 2.6 seconds is performed for each ink.

Next, for each type of ink, the CPU 502 adds the dot count value C obtained in S1102 to the corresponding count value C1 (S1104). Furthermore, for each type of ink, the CPU 502 updates the corresponding count value C1 to the value obtained by the addition performed in S1104 (S1106). Thereafter, for each type of ink, the CPU 502 determines whether or not the count value C1 is equal to or greater than the threshold value C1th (S1108). The threshold value C1th may be set for each type of ink or may be set to a value common to the respective inks. That is, the threshold value C1th is set according to the characteristics of the inks to be used. In S1108, if the count value C1 is equal to or greater than the threshold value C1th for at least one of the inks, it is determined that the count value C1 is equal to or greater than the threshold value C1th. Further, if the count value C1 is less than the threshold value C1th for all of the inks, it is determined that the count value C1 is not equal to or greater than the threshold value C1th.

If it is determined in S1108 that the count value C1 is not equal to or greater than the threshold value C1th, this preliminary ejection post-process ends. Further, if it is determined in S1108 that the count value C1 is equal to or greater than the threshold value C1th, the CPU 502 executes recovery process to perform the recovery operation for removing the bubbles generated in the ink inside the print head (S1110). Thereafter, the CPU 502 initializes the count values C1 corresponding to the respective inks (S1112) and ends this preliminary ejection post-process. Since the specific details of processing of S1110 and S1112 are the same as those of S714 and S716, the explanations thereof are omitted.

Note that the count value C1 is updated in this preliminary ejection post-process and the obtainment process in the print process, and is saved in a storage area such as the RAM 508. Therefore, if the preliminary ejection post-process and the obtainment process are executed in parallel, the count value C1 updated in one of the processes is reflected in the other process in a real time.

Although the counted value C1 is shared in the preliminary ejection post-process and the print process, in the above-described explanation, there is not a limitation as such. It is also possible to manage different count values C1 for the preliminary ejection post-process and print process. In this case, different threshold values C1th are set for the preliminary ejection post-process and the print process. For example, the threshold value C1th to be used in the preliminary ejection post-process is $3.1\times10^{7}$. This threshold value C1th is determined, for example, by checking an ejection failure according to an accumulated value of dot count values during the time of preliminary ejection in experiments.

Further, in this case, if the recovery operation is executed in one of the preliminary ejection post-process and the print process, the count value C1 corresponding to the other process is initialized.

As explained above, in the present embodiment, the dot count value C during the time of preliminary ejection is reflected in the count value C1 to be used for determining whether or not to execute the recovery operation. Further, the recovery operation is executed based on the count value C1 reflecting the dot count value during the time of preliminary ejection. Accordingly, in the present embodiment, the recovery operation can be executed at more proper timings.

Fourth Embodiment

Figure 12:
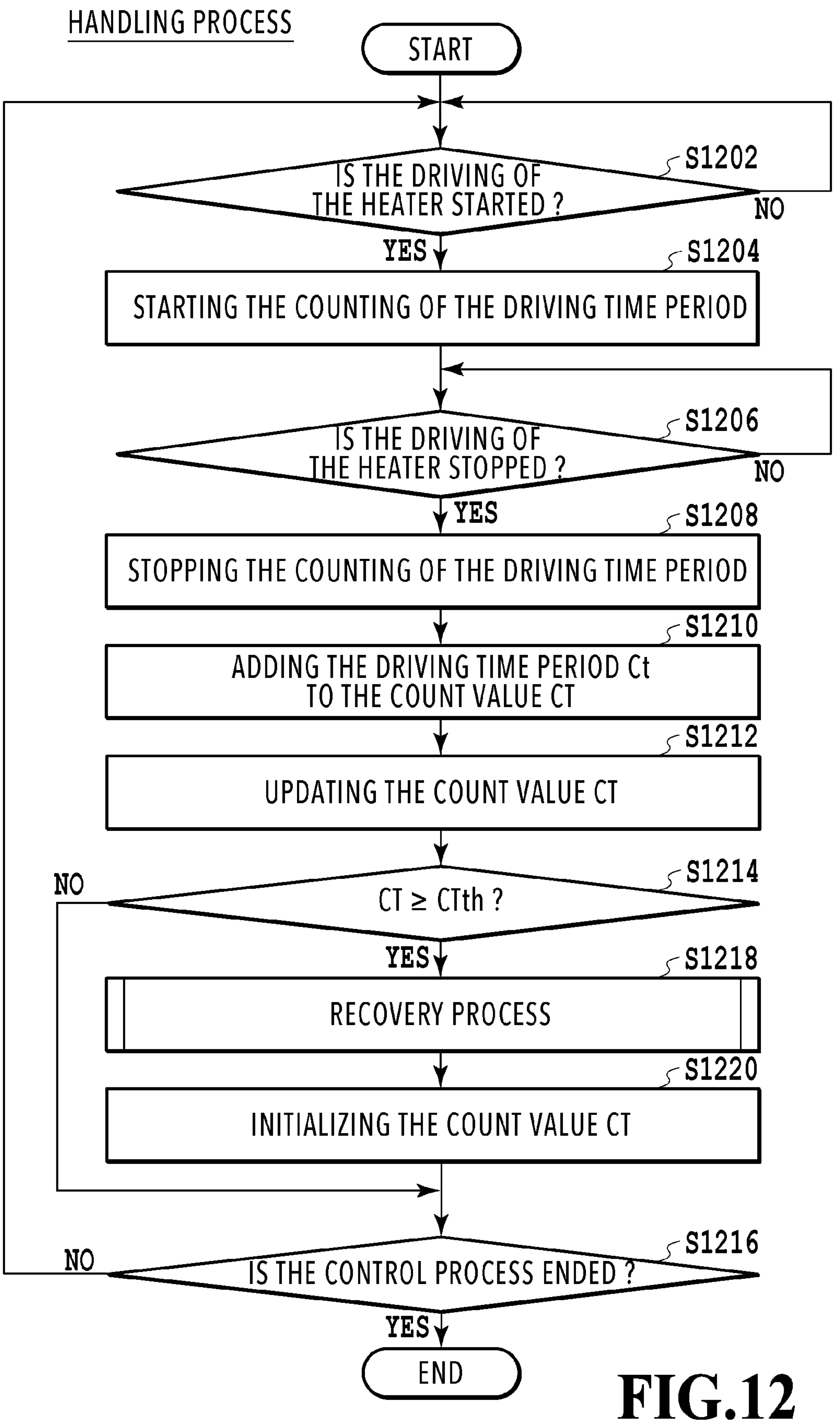
FIG. 12 is a flowchart illustrating a processing routine of a handling process.

Next, with reference to FIG. 12, an explanation is given of the printing apparatus according to the fourth embodiment. Note that, in the following explanation, the same or corresponding configurations as those of the printing apparatus according to the first embodiment described above are assigned with the same signs as those used in the first embodiment, so as to omit detailed explanations thereof.

The print head 42 is equipped with the sensor 526 capable of detecting the temperature of the ink inside the print head 42 and the heater 528 capable of heating the ink. Further, based on detection results of the sensor 526, the temperature of the ink inside the print head is kept within a certain range by the heater 528. Heating of the ink inside the print head 42 by the heater 528 also causes bubbles in the ink inside the print head 42 due to gas dissolved in the ink. Further, the generated bubbles accumulate in the ink inside the print head 42, and, if the time period of the heat application with the heater 528 exceeds a certain period of time, the bubbles accumulated in the ink cause an ejection failure.

Therefore, in the fourth embodiment, apart from the dot count value C, the recovery operation is executed based on the driving time period of the heater 528. Note that the heater 528 starts driving at a predetermined timing, such as at the timing when the printing apparatus 10 is launched, and stops driving if the temperature of the ink inside the print head 42 reaches the upper limit value of the set temperature, and, thereafter, the driving is resumed if the temperature reaches the lower limit value of the set temperature. Therefore, in the present embodiment, the control process for controlling the temperature of the ink inside the print head 42 with the heater 528 is started at a predetermined timing. Furthermore, in the present embodiment, if the control process is started, the handling process in which handling with the recovery operation is performed according to the driving time period of the heater 528 is started. That is, the control process and the handling process are executed in parallel. Note that, as for the control process, the explanation thereof is omitted since publicly-known technologies can be applied. Hereafter, a detailed explanation is given of the handling process.

<Handling Process>

In the printing apparatus 10, if the driving of the heater 528 is started at a predetermined timing, the handling process is started. FIG. 12 is a flowchart illustrating a detailed processing routine of the handling process. The series of the processes illustrated in the flowchart of FIG. 12 is performed by the CPU 502 loading a program code stored in the ROM 506 into the RAM 508 and executing the program code. Alternatively, a part of or all of the functions in the steps of FIG. 12 may be executed by hardware such as an ASIC or an electronic circuit.

If the handling process is started, first, the CPU 502 determines whether or not the driving of the heater 528 is started (S1202). In S1202, whether or not the driving of the heater 528 is started is determined in the control process. If it is determined in S1202 that the driving of the heater 528 is not started, the processing returns to S1202. Further, if it is determined in S1202 that the driving of the heater 528 is started, the CPU 502 starts counting the driving time period of the heater 528 with the clock 516 (S1204).

Next, whether or not the driving of the heater 528 is stopped is determined (S1206). In S1206, whether or not the driving of the heater 528 is stopped is determined in the control process. If it is determined in S1206 that the driving of the heater 528 is not stopped, the processing returns to S1206. Further, if it is determined in S1206 that the driving of the heater 528 is stopped, the CPU 502 stops counting the driving time period of the heater 528 with the clock 516 (S1208).

Thereafter, the CPU 502 obtains the driving time period Ct of the heater 528 counted by the clock 516 and adds the driving time period Ct to the count value CT, which is used for determining whether or not to execute the recovery operation of the handling process (S1210). The count value CT is an accumulated value of driving time periods Ct and is stored in a storage area such as the RAM 508, and its initial value is "0". Further, the count value CT is managed separately from the count value C1 to which the dot count value C is added. Furthermore, the CPU 502 updates the count value CT to the value obtained in S1210 (S1212) and determines whether or not the count value CT is equal to or greater than the threshold value CTth (S1214). In the present embodiment, the threshold value CTth is set to 10800 seconds. This threshold value CTth (set value) is determined, for example, by checking ejection failures according to driving time periods of the heater 528 in experiments.

If it is determined in S1214 that the count value CT is not equal to or greater than the threshold value CTth, i.e., is less than the threshold value CTth, the CPU 502 determines whether or not the control process is ended (S1216). If it is determined, in S1216, that the control process is ended, this handling process ends. Further, if it is determined in S1216 that the control process is not ended, the processing returns to S1202.

On the other hand, if it is determined in S1214 that the count value CT is equal to or greater than the threshold value CTth, the CPU 502 executes recovery process to perform the recovery operation for removing bubbles generated in the ink in the print head (S1218). Furthermore, the CPU 502 initializes the count value CT (S1220), and the processing proceeds to S1216. Note that, since the specific details of processing of S1218 and S1220 are the same as those of S714 and S716, the explanations thereof are omitted.

In the present embodiment, the recovery process is executed in the handling process and the print process. Therefore, if the recovery process is executed in one of the handling process and the print process, the count value (C1 or CT) used in the other process may be initialized. Accordingly, execution of unnecessary recovery operations is suppressed.

As explained above, in the present embodiment, in addition to the print process in which the dot count value is used for making a determination about execution of the recovery operation, the handling process in which the driving time period of the heater 528 is used for making a determination about execution of the recovery operation is executed. Accordingly, it is possible to suppress the occurrence of ejection failures caused by the heat application to the ink inside the print head 42 with the heater 528. Therefore, it is possible to cope with the difference in the cause of generation of bubbles inside the print head 42, and, thus, it is possible to execute the recovery operation at more proper timings.

Fifth Embodiment

Figure 13:
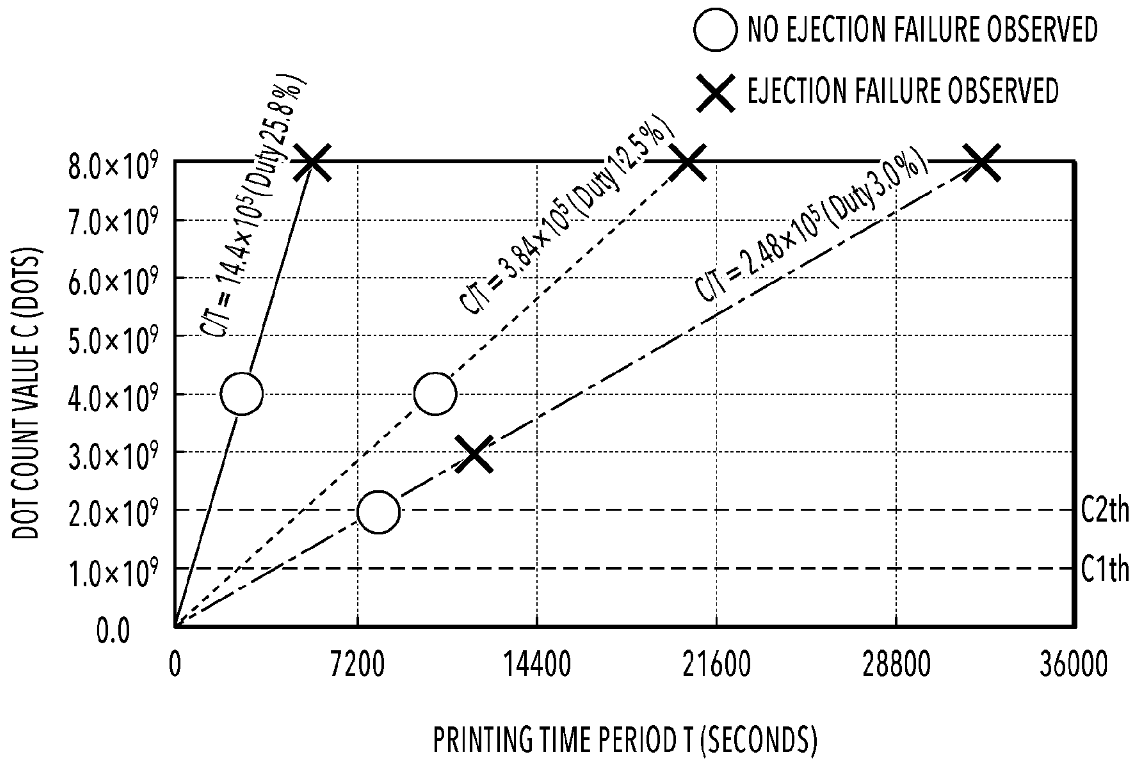
FIG. 13 is a graph illustrating occurrence of ejection failures in printing with different dot count values per unit time.
Figure 14:
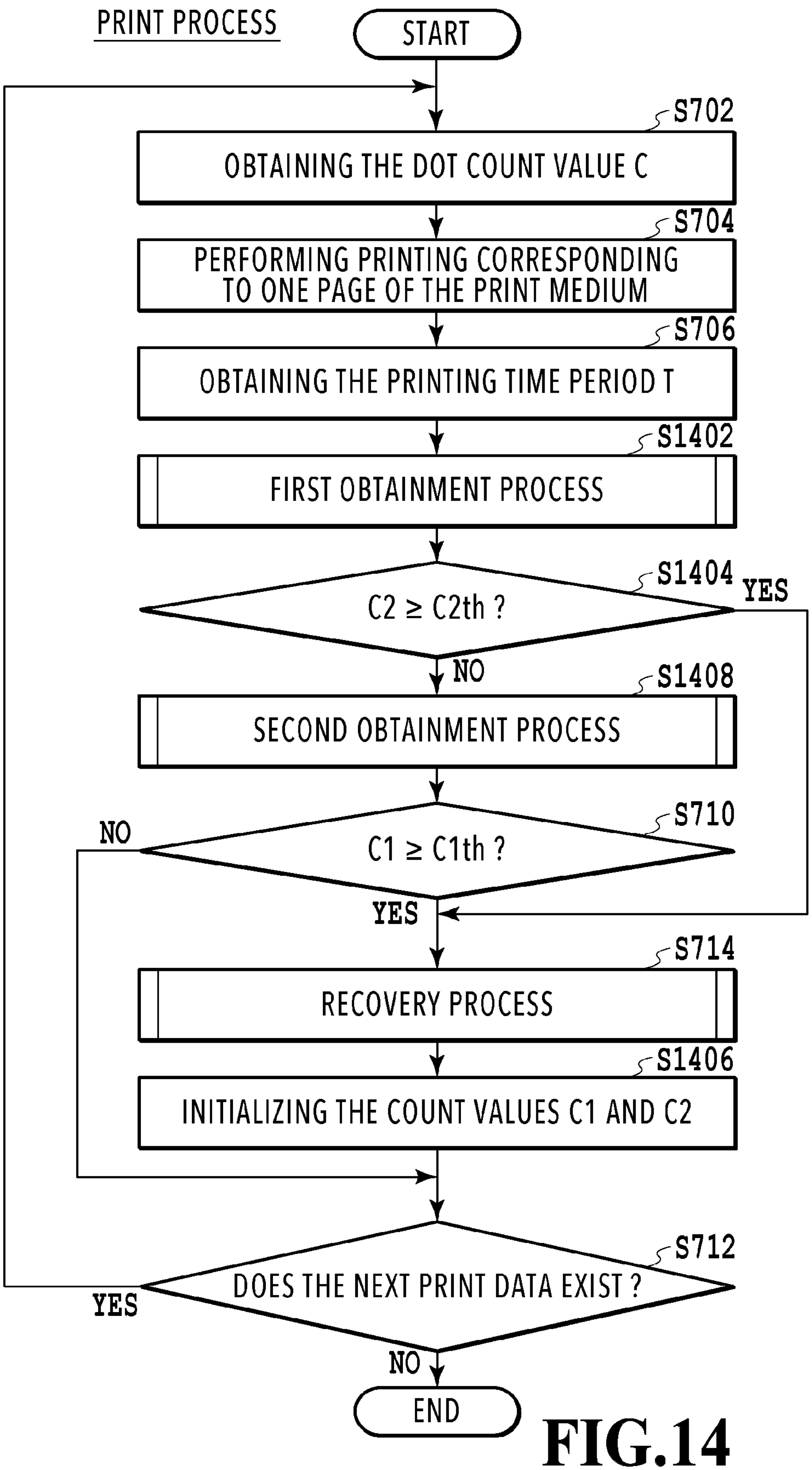
FIG. 14 is a flowchart illustrating a processing routine of a print process of another embodiment.
Figure 15:
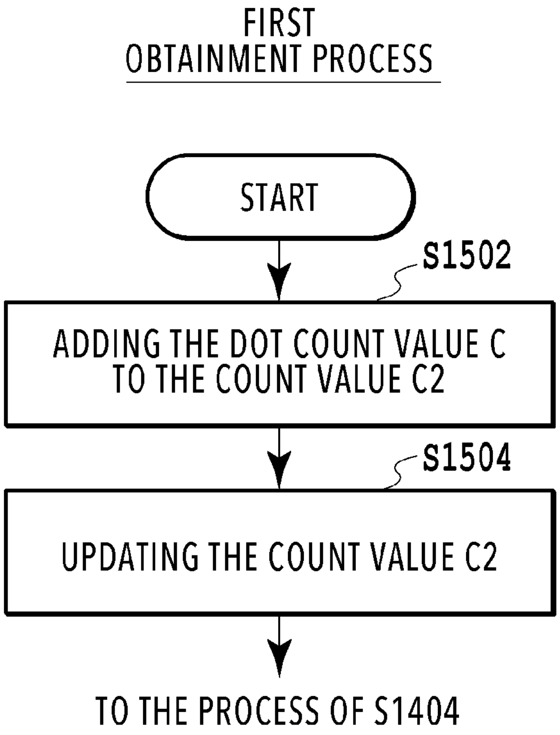
FIG. 15 is a flowchart illustrating a processing routine of the first obtainment process, which is a subroutine of the print process of FIG. 14.

Next, with reference to FIG. 13 through FIG. 15, an explanation is given of the printing apparatus according to the fifth embodiment. Note that, in the following explanation, the same or corresponding configurations as those of the printing apparatus according to the first embodiment described above are assigned with the same signs as those used in the first embodiment, so as to omit detailed explanations thereof.

Here, as a result of studies, the inventors of the present application found that, if the amount of one ink droplet ejected from a nozzle decreases, bubbles in ink inside the print head grow even with the same dot count value.

Hereafter, an explanation is given of the experiment conducted by the inventors of the present application. The inventors of the present application changed only the amount of one ink droplet ejected from nozzles, specifically, changed the amount from 12 pl to 5 pl, among the various conditions used for the experiment that led to the experiment results of FIG. 6, and conducted the same experiment. That is, this experiment was performed using the print head 42 with which the amount of one ink droplet ejected from the nozzles 302 is 5 pl. The results are illustrated in FIG. 13. FIG. 13 is a graph illustrating the experiment results with the amount of one ink droplet to be ejected being set to 5 pl out of the experiment conditions that leads to the experiment results of FIG. 6. In the graph of FIG. 13, as with the graph of FIG. 6, the horizontal axis indicates the printing time period T, and the vertical axis indicates the dot count value C during the time of printing. Further, if faintness, streaks, and ink non-ejection were not confirmed in the printing results by visual observation, it was evaluated that no ejection failure has occurred, which is indicated as circle marks in the graph. Further, if faintness, streaks, and ink non-ejection were confirmed in the printing results by visual observation, it was evaluated that ejection failure has occurred, which is indicated as cross marks in the graph. Further, of the three evaluation conditions, a duty of 25.8% is indicated by the solid line, a duty of 12.5% is indicated by the dashed line, and a duty of 3.0% is indicated by the long dashed short dashed line.

In the graph of FIG. 13, regarding the evaluation patterns after printing with the dot count value C being set to $8.0\times10^9$, ejection failure was observed under all three evaluation conditions. Note that, in the graph of FIG. 6, no ejection failure was observed under the two evaluation conditions of the duty of 25.8% and the duty of 12.5%. As described above, if the ejection amount of one ink droplet becomes small, bubbles accumulate in the ink inside the print head 42, and thus ejection failure occurs accordingly. Further, regarding the evaluation patterns after printing with the dot count value C being set to $4.0\times10^9$, ejection failure was not observed in the case of the duty of 25.8% and the duty of 12.5% among the three evaluation conditions. Note that, as for the duty of 3.0%, the ejection failure was observed in the case when the dot count value C was $4.0\times10^9$ in the experiment that leads to the experimental results of FIG. 6, and, thus, evaluation for ejection failure with the evaluation pattern at this point in time was not conducted in the present experiment.

Ejection failure was observed in the case of the duty of 3.0% with the evaluation pattern after printing with the dot count value C being set to $3.0\times10^9$. Note that, since only the case of the duty of 3.0% was evaluated with ejection failure in the experiment that leads to the experimental results of FIG. 6, the evaluation for ejection failure was performed only in the case of the duty of 3.0%. Further, because of the result that ejection failure was observed at the duty of 3.0% in the evaluation pattern after printing with the dot count value C being set to $3.0\times10^9$, evaluation of the dot count value C being even smaller is performed at the duty of 3.0%. In the evaluation pattern after printing with the dot count value C being set to $2.0\times10^9$, no ejection failure was observed at the duty of 3.0%.

As described above, it can be seen that, if the amount of one ink droplet ejected from nozzles is small, bubbles are likely to accumulate in the ink inside the print head 42, and ejection failures are more likely to occur, compared to a case in which the amount is great.

Therefore, in the present embodiment, the two threshold values C1th and C2th are used as the threshold value Cth to be used for determining whether or not to execute the recovery operation. Specifically, as the threshold value Ath, the dot count value C/T per unit time is set to $3.0\times10^5$, that is, between the duties of 25.8% and 12.5%, which show relatively the same tendency, and the duty of 3.0%, which shows a tendency different from those. Further, the threshold value C1th (the second threshold value) was set to $1.0\times10^9$, which is a half of $2.0\times10^9$ at which no ejection failure was observed in the case of the duty of 3.0%. Furthermore, the threshold value C2th (the first threshold value) was set to $2.0\times10^9$, which is a half of $4.0\times10^9$ at which no ejection failure was observed in the case of the duties of 25.8% and 12.5%.

<Print Process>

Next, a detailed explanation is given of the print process executed in the printing apparatus 10 according to the present embodiment. FIG. 14 is a flowchart illustrating a detailed processing routine of the print process executed in the printing apparatus according to the fifth embodiment. FIG. 15 is a flowchart illustrating a detailed processing routine of the first obtainment process, which is a subroutine of the print process of FIG. 14. The series of the processes illustrated in the flowcharts of FIG. 14 and FIG. 15 is performed by the CPU 502 loading a program code stored in the ROM 506 into the RAM 508 and executing the program code. Alternatively, a part of or all of the functions in the steps of FIG. 14 and FIG. 15 may be executed by hardware such as an ASIC or an electronic circuit.

In the following explanation of the print process, it is assumed that image data is input to the printing apparatus 10 in advance, print data corresponding to one page is generated by the image processing part 518, the print data is divided for each print operation, and the divided print data is stored in the RAM 508. Note that, in the print process executed in the present embodiment, there are processes that have the same processing contents as the processes executed in the print process explained in the first embodiment. Therefore, in the following explanation, the processes with the same processing contents as in the print process of FIG. 7 are assigned with the same signs as those of the print process of FIG. 7, so as to omit a detailed explanation thereof.

After the print process is started and the printing time period T, which is the time period counted by the clock 516, is obtained in S706, the CPU 502 then executes the first obtainment process for obtaining the count value C2 to be used for determining whether or not to execute the recovery operation (S1402). In the present embodiment, the two count values C1 and C2, which are accumulated values of dot count values C, are stored in a storage area such as the RAM 508 for each type of ink. The initial values of the count value C1 (the second count value) and the count value C2 (the first count value) are "0".

In S1402, the first obtainment process illustrated in FIG. 15 is executed. As for this first obtainment process, the count value C2 is obtained for each type of ink. If the first obtainment process is started, first, the dot count value C (obtained in S702 or S706) is added to the count value C2 (S1502). Thereafter, the CPU 502 updates the stored count value C2 to the value obtained in S1502, and the processing proceeds to S1404, which is described later.

Returning to FIG. 14, the explanation is continued. If the first obtainment process ends, the processing proceeds to S1404, and the CPU 502 determines whether or not the count value C2 is equal to or greater than the threshold value C2th. The threshold value C2th is stored in a storage area such as the RAM 508. The threshold value C2th may be set for each type of ink or may be set to a value common to the respective inks. That is, the threshold value C1th is set according to the characteristics of the inks to be used. In S1404, if the count value C2 is equal to or greater than the threshold value C2th for at least one of the inks, it is determined that the count value C2 is equal to or greater than the threshold value C2th. Further, if the count value C2 is less than the threshold value C2th for all of the inks, it is determined that the count value C2 is not equal to or greater than the threshold value C2th. If it is determined in S1404 that the count value C2 is equal to or greater than the threshold value C2th, the processing proceeds to S714 to perform the recovery process. Thereafter, the CPU 502 initializes the count values C1 and count values C2 corresponding to the respective inks (S1406), and the processing proceeds to S712.

Further, if it is determined in S1404 that the count value C2 is not equal to or greater than the threshold value C2th, the CPU 502 executes second obtainment process (S1408). Since the specific processing contents of the second obtainment process in S1408 are the same as those of the obtainment process illustrated in FIG. 8, a detailed explanation thereof is omitted. Thereafter, the processing proceeds to S710, so as to determine whether or not the stored count value C1 is equal to or greater than the threshold value C1th.

In the present embodiment, although, corresponding to the first embodiment, the dot count value C and the printing time period T at the point in time when printing corresponding to one page of the print medium is performed with multiple times of print operations are obtained, so that the execution of the recovery operation is controlled by use of these values, there is not a limitation as such. It is also possible that, corresponding to the second embodiment, the dot count value C and the printing time period at the point in time when printing on a predetermined area of an image corresponding to one page of the print medium is performed with one print operation are obtained so that the execution of the recovery operation is controlled by use of these values. In this case, for example, the first obtainment process and the second obtainment process are executed after S1010, and the processing proceeds to S1014. Further, if it is determined in S1014 that print data corresponding to the (m+1)th print operation does not exist, determination of S1404 is performed. In S1404, if it is determined that C2≥C2th is satisfied, the processing proceeds to S1024, and, if it is determined that C2≥C2th is not satisfied, the processing proceeds to S1018.

In a case when the present embodiment is used in combination with the technology explained in the third embodiment, regarding the adding of the dot count value at the timing of preliminary ejection, the dot count value may be added to the counted value C1 or may be added to the counted value C2. Alternatively, the dot counted value may be added to both of the count values C1 and C2. Therefore, in this case, in S1108, whether or not the count value obtained by adding the dot count value at the timing of preliminary ejection is equal to or greater than the corresponding threshold value is determined.

In the present disclosure, although the print process of the first embodiment is executed in a case when the amount of one ink droplet ejected from the nozzles is 12 μl and the print process of the fifth embodiment is executed in a case when the amount is 5 pl, there is not a limitation as such. For example, in a case of an ink that easily generates bubbles therein, it may be preferable to execute the print process of the fifth embodiment even if the amount of one ink droplet ejected from the nozzles is 12 pl. That is, which of the print process of the first embodiment and the print process of the fifth embodiment is to be executed is determined by performing experiments or the like according to, for example, the characteristics of the ink, the amount of one ink droplet ejected from the nozzles, etc.

As explained above, in the present embodiment, the two count values are used for making a determination about execution of the recovery operation. First, whether or not to execute the recovery operation is determined based on the count value C2, to which the dot count value C during the time of a print operation is simply added, and the threshold value C2th. Thereafter, in a case when the dot count value C/T per unit time is equal to or less than the threshold value Ath, whether or not to execute the recovery operation is determined based on the count value C1, to which the dot count value C during the time of a print operation is added, and the threshold value C1th.

Accordingly, even if the printing apparatus 10 is designed to easily generate bubbles in the ink inside the print head due to the characteristics of the ink, the amount of ink droplets ejected from the nozzles, etc., the same effect as the above-described first embodiment can be obtained.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., ua central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), ua digital versatile disc (DVD), or a Blu-ray Disc (BD)™), a flash memory device, a memory card, and the like.

Further, although the printing apparatus 10 is explained as a serial-scan type printing apparatus, in the above-described embodiments, there is not a limitation as such. It is also possible that the printing apparatus 10 is what is termed as a full-line type printing apparatus, in which the nozzle arrays in the print head extend across the width of the print medium, for example.

Furthermore, although the control part 500 obtains the dot count value, the printing time period, etc., to determine whether or not to execute the recovery operation, in the above-described embodiments, there is not a limitation as such. It is also possible that the determination is executed in an apparatus that is installed separately from the printing apparatus 10, such as the host apparatus 524. In this case, the dot count value C counted by the dot counter 520, the printing time period T counted by the clock 516, etc., are output to the above-described apparatus, so that, in the above-described apparatus, the determination is executed based on the input information. Note that determination results are output to the printing apparatus 10, and the recovery operation is executed in the printing apparatus 10 based on the determination results. In this case, the above-described apparatus functions as an information processing apparatus. Further, the control part of the above-described apparatus functions as an obtainment part that obtains the dot count value C and the printing time period T, and, as a determination part that determines whether or not to execute the recovery operation, based on the dot count value C, the printing time period T, the count value C1, etc.

Furthermore, although the printing apparatus 10 is configured to move the print medium M in the Y direction and to move the print head 42 in the X direction, in the above-described embodiments, there is not a limitation as such. That is, as long as the printing apparatus 10 has a configuration in which relative movement of the print medium M and the print head 42 is performed, such a configuration in which one of them is fixed is also possible.

It is also possible to combine the forms described as other embodiments and the forms described in the above-described embodiments as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:

a printing unit configured to print an image by ejecting ink to a print medium;

a recovery unit configured to be capable of executing a recovery operation for maintaining and recovering a favorable ink ejection performance of the printing unit;

an obtainment unit configured to obtain a dot count value, which is the number of times ink is ejected during printing performed by the printing unit, and a printing time period, which is a time period required for the printing; and a control unit configured to control the execution of the recovery operation, based on a count value, which is an accumulated value of the dot count value, and a threshold value for determining whether or not to execute the recovery operation to be performed by the recovery unit, wherein, in a case when a dot count value per unit time based on the dot count value and the printing time period is equal to or less than a predetermined value, the control unit updates the count value to a value to which the dot count value is added, in order to control the execution of the recovery operation based on the updated count value and the threshold value, and wherein, in a case when the dot count value per unit time is greater than the predetermined value, the control unit controls the execution of the recovery operation based on the count value and the threshold value without adding the dot count value to the count value.

2. The printing apparatus according to claim 1, wherein the obtainment unit obtains the dot count value and the printing time period of a print operation for printing an image corresponding to one page of the print medium.

3. The printing apparatus according to claim 1, wherein the obtainment unit obtains the dot count value and the printing time period of one print operation.

4. The printing apparatus according to claim 1, wherein, at a predetermined timing, the printing unit executes preliminary ejection, which is ink ejection that does not contribute to printing, wherein the obtainment unit obtains a preliminary ejection dot count value, which is the number of times ink is ejected during the preliminary ejection, and wherein the control unit updates the count value to a value to which the preliminary ejection dot count value is added, in order to control the execution of the recovery operation based on the updated count value and the threshold value.

5. The printing apparatus according to claim 1, further comprising a heating unit configured to be capable of heating ink in the printing unit, wherein the obtainment unit obtains a driving time period of the heating unit, and wherein the control unit controls the execution of the recovery operation, based on the driving time period and a set value, which is a threshold value for determining whether or not to execute the recovery operation based on the driving time period.

6. The printing apparatus according to claim 1, wherein, of a plurality of conditions with different dot count values per unit time, the predetermined value is a value between a condition in which ejection failure occurs in printing with a predetermined count value and a condition in which ejection failure does not occur in printing with the predetermined count value.

7. The printing apparatus according to claim 1, wherein the recovery operation is an operation in which ink is suctioned from a nozzle that ejects ink in the printing unit.

8. A printing apparatus comprising:

a printing unit configured to print an image by ejecting ink to a print medium;

a recovery unit configured to be capable of executing a recovery operation for maintaining and recovering a favorable ink ejection performance of the printing unit;

an obtainment unit configured to obtain a dot count value, which is the number of times ink is ejected during printing performed by the printing unit, and a printing time period, which is a time period required for the printing; and a control unit configured to control the execution of the recovery operation, based on a first count value and second count value, which are accumulated values of the dot count value, and a first threshold value and second threshold value for determining whether or not to execute the recovery operation to be performed by the recovery unit, wherein the control unit controls the execution of the recovery operation based on the first count value that has been updated to a value to which the dot count value is added and the first threshold value, and wherein, in a case when the recovery operation is not executed based on the first count value that has been updated to the value to which the dot count value is added and the first threshold value, in a case when a dot count value per unit time based on the dot count value and the printing time period is equal to or less than a predetermined value, the control unit updates the second count value to a value to which the dot count value is added, in order to control the execution of the recovery operation based on the updated second count value and the second threshold value, and, in a case when the dot count value per unit time is greater than the predetermined value, the control unit controls the execution of the recovery operation based on the second count value and the second threshold value without adding the dot count value to the second count value.

9. The printing apparatus according to claim 8, wherein the obtainment unit obtains the dot count value and the printing time period of a print operation for printing an image corresponding to one page of the print medium.

10. The printing apparatus according to claim 8, wherein the obtainment unit obtains the dot count value and the printing time period of one print operation.

11. The printing apparatus according to claim 8, further comprising a heating unit configured to be capable of heating ink in the printing unit, wherein the obtainment unit obtains a driving time period of the heating unit, and wherein the control unit controls the execution of the recovery operation, based on the driving time period and a set value, which is a threshold value for determining whether or not to execute the recovery operation based on the driving time period.

12. The printing apparatus according to claim 8, wherein, of a plurality of conditions with different dot count values per unit time, the predetermined value is a value between a condition in which ejection failure occurs in printing with a predetermined count value and a condition in which ejection failure does not occur in printing with the predetermined count value.

13. The printing apparatus according to claim 8, wherein the recovery operation is an operation in which ink is suctioned from a nozzle that ejects ink in the printing unit.

14. A control method for controlling a printing apparatus including a printing unit configured to print an image by ejecting ink to a print medium and a recovery unit configured to be capable of executing a recovery operation for maintaining and recovering a favorable ink ejection performance of the printing unit, the control method comprising:

an obtainment step for obtaining a dot count value, which is the number of times ink is ejected during printing performed by the printing unit, and a printing time period, which is a time period required for the printing; and a control step for controlling the execution of the recovery operation, based on a count value, which is an accumulated value of the dot count value, and a threshold value for determining whether or not to execute the recovery operation, wherein, in the control step, in a case when a dot count value per unit time based on the dot count value and the printing time period is equal to or less than a predetermined value, the count value is updated to a value to which the dot count value is added, in order to control the execution of the recovery operation based on the updated count value and the threshold value, and, in a case when the dot count value per unit time is greater than the predetermined value, the execution of the recovery operation is controlled based on the count value and the threshold value without adding the dot count value to the count value.

15. A control method for controlling a printing apparatus including a printing unit configured to print an image by ejecting ink to a print medium and a recovery unit configured to be capable of executing a recovery operation for maintaining and recovering a favorable ink ejection performance of the printing unit, the control method comprising:

an obtainment step for obtaining a dot count value, which is the number of times ink is ejected during printing performed by the printing unit, and a printing time period, which is a time period required for the printing; and a control step for controlling the execution of the recovery operation, based on a first count value and second count value, which are accumulated values of the dot count value, and a first threshold value and second threshold value for determining whether or not to execute the recovery operation, wherein, in the control step, the execution of the recovery operation is controlled based on the first count value that has been updated to a value to which the dot count value is added and the first threshold value, and, in a case when the recovery operation is not executed based on the first count value that has been updated to the value to which the dot count value is added and the first threshold value, in a case when a dot count value per unit time based on the dot count value and the printing time period is equal to or less than a predetermined value, the second count value is updated to a value to which the dot count value is added, in order to control the execution of the recovery operation based on the updated second count value and the second threshold value, and, in a case when the dot count value per unit time is greater than the predetermined value, the execution of the recovery operation is controlled based on the second count value and the second threshold value without adding the dot count value to the second count value.

* * * * *